United States Patent [19]

Molusis et al.

[11] 4,418,381
[45] Nov. 29, 1983

[54] SINGLE LOOP CONTROL SYSTEM

[75] Inventors: Anthony J. Molusis, Southington; Thomas M. O'Loughlin, Milford, both of Conn.

[73] Assignee: Bristol Babcock Inc., Waterbury, Conn.

[21] Appl. No.: 227,970

[22] Filed: Jan. 23, 1981

[51] Int. Cl.³ .................... G06F 15/46; G06F 15/16; G05B 11/42
[52] U.S. Cl. .................................. 364/131; 318/561; 318/610; 340/722; 364/157; 364/160; 364/162; 364/188
[58] Field of Search ............................... 364/131–135, 364/180, 181, 187, 160–162, 157, 188, 189; 318/561, 609, 610; 340/722, 753

[56] References Cited

U.S. PATENT DOCUMENTS

| | | | |
|---|---|---|---|
| 3,636,331 | 1/1972 | Amrehn | 364/187 |
| 3,959,636 | 5/1976 | Johnson et al. | 364/180 X |
| 4,215,398 | 7/1980 | Burkett et al. | 364/162 X |
| 4,218,733 | 8/1980 | Maselli | 318/610 X |
| 4,232,364 | 11/1980 | Bibbero | 364/162 X |
| 4,251,858 | 2/1981 | Cambigue et al. | 364/132 |
| 4,303,973 | 12/1981 | Williamson, Jr. et al. | 364/138 X |

OTHER PUBLICATIONS

Wood–"De-centralization of Intelligence–The Key to Low-Cost Control?–Control and Instrumentation," vol. 7, No. 9, Oct. 1975-pp. 30-33.
Sendler–"A Failure Tolerant Controller Station on the Basis of A bus-Oriented Multi-Microcomputer System"-Regelungstechnische Praxis, vol. 22, No. 3, Mar. 1980, p. 73-81.

*Primary Examiner*—Joseph F. Ruggiero
*Attorney, Agent, or Firm*—Pennie & Edmonds

[57] ABSTRACT

A microprocessor based single loop control instrument is described which can operate as any one of several different types of controllers, each of which can provide two or more different modes of operation. The control instrument comprises a microprocessor, a read only memory in which is stored the operating program for the control instrument, means for causing the control instrument to operate as one of the types of controllers provided for by a program stored in the read only memory and means for selecting the mode of operation of the controller. Further, in accordance with the invention, the control instrument is supplied with a control panel controlled by a second microprocessor and connected to the first microprocessor by a communication bus. The second microprocessor controls a bar graph display for displaying at least one signal related to the operation of the control instrument as well as means for selecting the signal that is displayed. Advantageously, the control panel also mounts switch means for selecting the mode of operation of the controller. Also in accordance with the invention, the control instrument can be configured by a keyboard/display which permits the selection of numerous processing options in the execution of the control algorithm.

12 Claims, 18 Drawing Figures

4,418,381

SINGLE LOOP CONTROL SYSTEM

CROSS REFERENCE TO RELATED APPLICATION

A related application is "Intelligent Keyboard/Display", Ser. No. 227,969, filed concurrently herewith and assigned to Bristol Babcock Inc. This application is incorporated herein by reference.

TECHNICAL FIELD

This relates to a single loop control (SLC) system used for process control and more particularly to a microprocessor-based control system.

BACKGROUND OF THE INVENTION

Process control systems are used in numerous applications to regulate one or more parameters of a process. Most control systems are closed loop control systems in which information about a controlled variable is fed back to a controller to serve as the basis for control of one or more process variables. A signal representative of the controlled variable is compared by the controller with a preset desired value, or set point, of the controlled variable. If there is a difference, the controller produces an output such as to reduce the difference by manipulating one or more of the process variables. For example, the controlled variable might be the temperature of an effluent stream from a mixing tank; and the process variables might be the temperature and flow rates of the streams emptying into the tank as well as the speed of a mixer in the tank. If the temperature of the effluent is too low, the controller might open a little more a valve regulating the flow of one of the streams emptying into the tank or adjust the speed of the mixer.

Many linear-feedback control systems can be represented by the input-output relationship:

$$\frac{C}{R} = \frac{KG}{1 + KGH},$$

where C is the output, R is the set point, KG is the forward-loop transfer function, H is the feedback loop transfer function, and KGH is the open-loop transfer function.

For many processes it can be shown that the best controller is one which provides proportional, integral and derivative (PID) control. Proportional control of a first order process reduces the time constant of the system and the apparent gain of the process. However, it also introduces a deviation, or offset, between the time average of the controlled variable and the set point. This offset can be compensated for by providing for integral, or reset, control in addition to proportional control. Although the use of integral control tends to slow the response of the system, derivative control counters this by tending to anticipate where a process is going so that it can correct for the change in error. Ideally, the PID transfer function is given by the following equation:

$$\frac{M(s)}{E(s)} = K_c \left(1 + \frac{1}{T_i s} + T_d s\right),$$

where M is the manipulated variable, E is the error, $K_c$ is the controller gain, $T_i$ is the reset time and $T_d$ is the rate or derivative time. Each manufacturer of PID controllers typically uses a somewhat different transfer function. Numerous techniques are available to design or tune PID controllers to practical application. Details concerning many of these techniques are set forth in Section 22 of Perry & Chilton, Chemical Engineer's Handbook (McGraw Hill, 5th Ed. 1973).

Until quite recently most process controllers were analog devices because analog circuitry was the only cost effective way to build a single-loop controller. Such devices, however, could not easily be modified and could not execute complex control algorithms. As a result, they tended to be expensive and/or had limited capability.

SUMMARY OF THE INVENTION

In the present invention a microprocessor-based single loop control instrument is provided which can operate as any one of several different types of controllers, each of which can provide two or more different modes of operation. The control instrument comprises a microprocessor, a read only memory in which is stored the operating program for the control instrument, means for causing the control instrument to operate as one of the types of controllers provided for by a program stored in the read only memory and means for selecting the mode of operation of the controller. Further, in accordance with the invention, the control instrument is supplied with a control panel controlled by a second microprocessor and connected to the first microprocessor by a communication bus. The second microprocessor controls a bar graph display for displaying at least one signal related to the operation of the control instrument as well as means for selecting the signal that is displayed. Advantageously, the control panel also mounts switch means for selecting the mode of operation of the controller. Also in accordance with the invention, the control instrument can be configured by a keyboard/display which permits the selection of numerous processing options in the execution of the control algorithm.

BRIEF DESCRIPTION OF DRAWING

These and other objects, features, elements and advantages of the invention will more readily be apparent from the following description of the best mode of practicing the invention in which.

BEST MODE OF PRACTICING THE INVENTION

Figure 1:
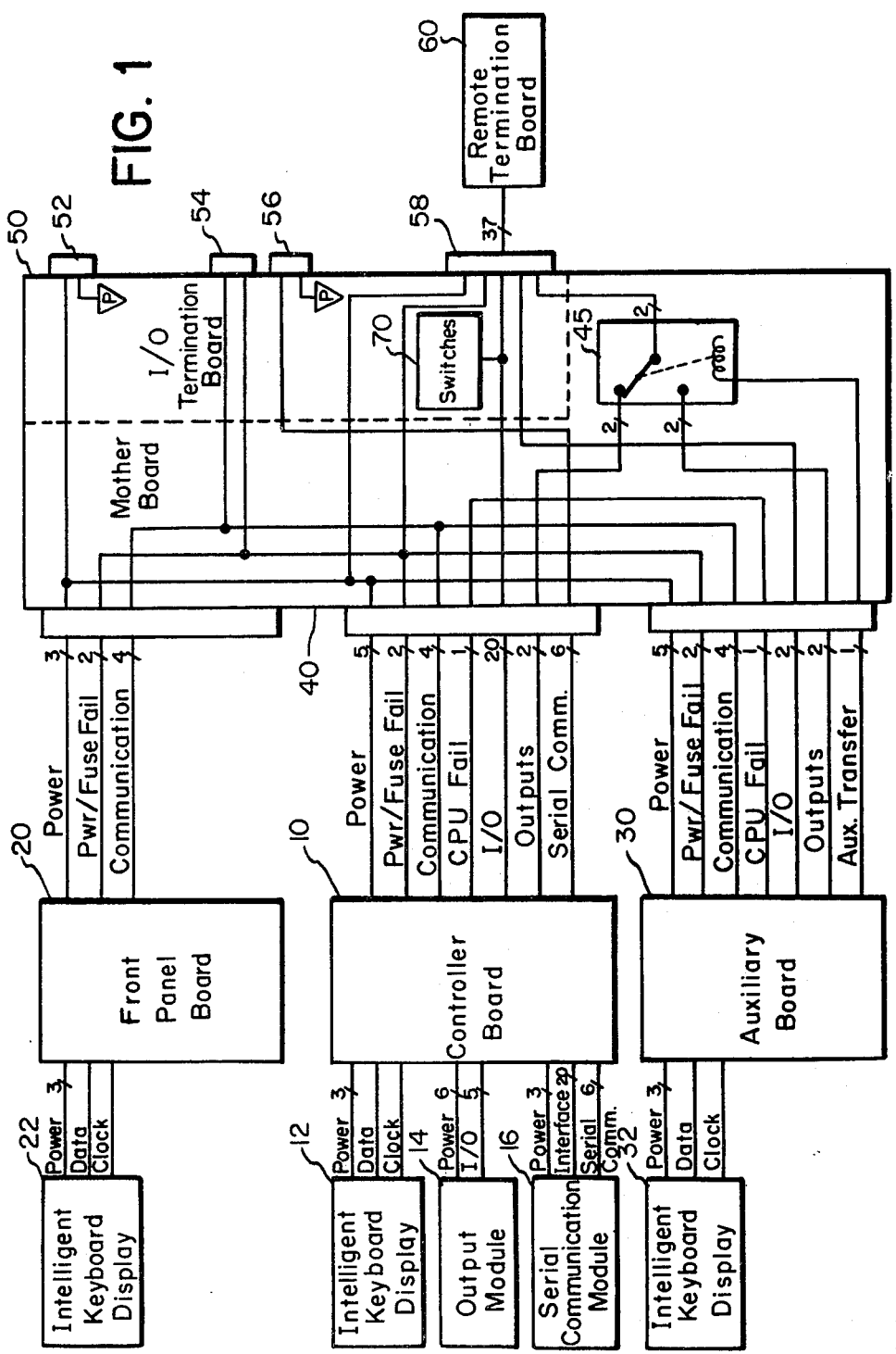
FIG. 1 is a schematic diagram of an illustrative embodiment of a single loop control system of the present invention.

FIG. 1 is a schematic diagram of a SLC system of the present invention comprising controller circuit board 10, a front panel board 20, an auxiliary board 30, a mother board 40 and an I/O termination board 50. Connected to each of controller board 10, front panel board 20, and auxiliary board 30 are intelligent keyboard/displays 12, 22, 32, respectively. Also connected to controller board 10 are an output module 14 and a serial communication module 16. I/O termination board 50 provides a power connector 52, a remote front panel connector 54, a communication connector 56 and a termination connector 58. A remote termination board 60 is connected to the I/O termination board 50 through termination connector 58. Up to eight DIP switches 70 provide voltage or current selection for the 20 analog inputs to the SLC system. For convenience, the function of various leads between the individual boards has been indicated; and where a single drawing line is used to represent more than one lead, the number of leads so represented is indicated by a numeral accompanying a slash mark through the drawing line.

As the name suggests, controller board 10 provides the main control for the system. However, each of controller board 10, front panel board 20, auxiliary board 30, the intelligent keyboard/displays and the serial communication module contains its own microcomputer in the form of a microprocessor and read only memory. Front panel board 20 provides a series of control switches and displays which may be located a considerable distance from the controller and other elements of the system. Auxiliary board 30 functions as a backup for controller board 10 and is switched into operation by a relay 45 on mother board 40 if the processor of controller board 10 should fail. The intelligent keyboard/displays are identical and provide a means for reading data from and writing data into a random access memory on controller board 10. The serial communication module provides a means for converting parallel data from the controller board to serial data that is compatable with standard interfaces such as the RS232 and RS423 interfaces.

Figure 2:
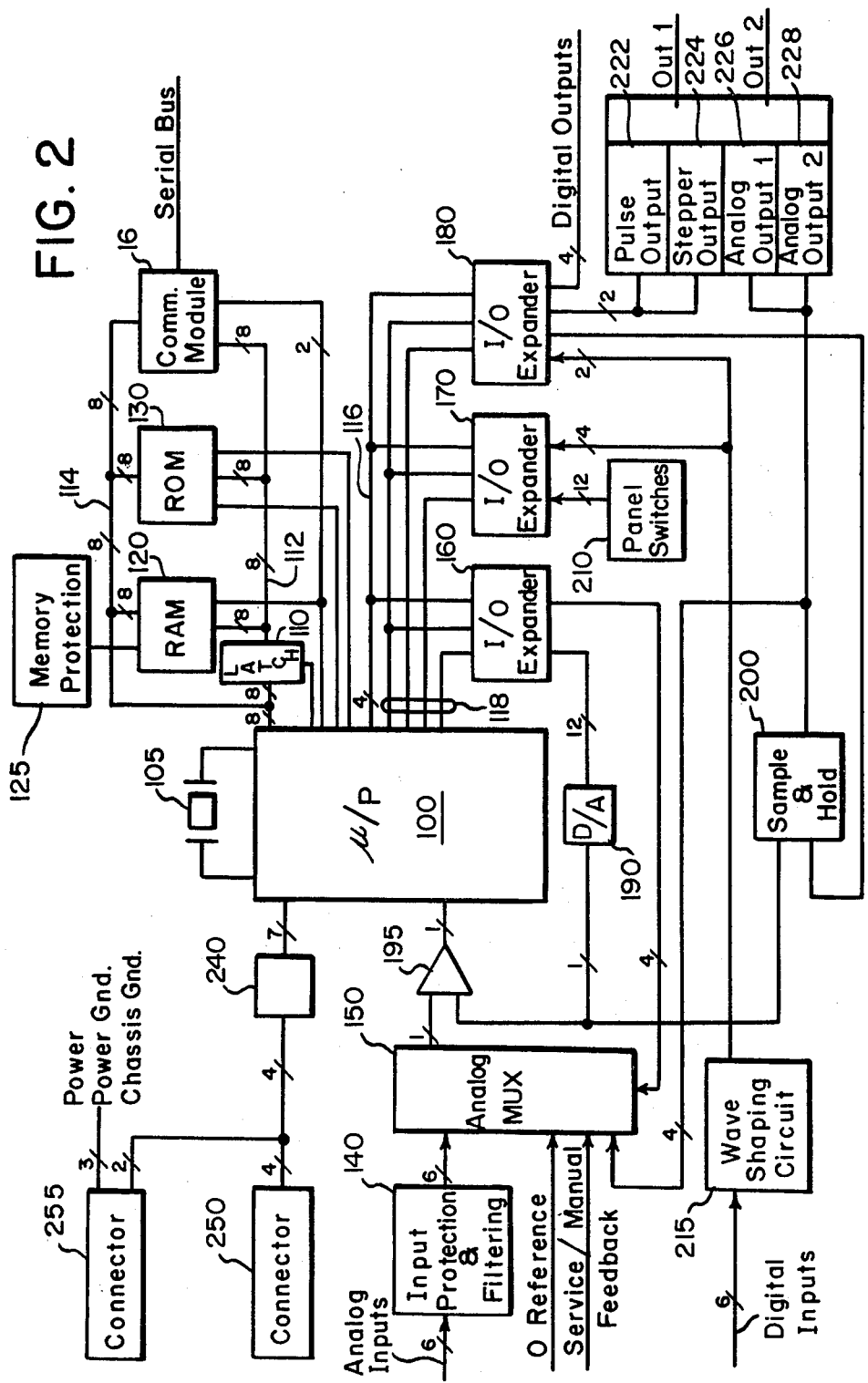
FIG. 2 is a schematic diagram of an illustrative embodiment of a controller which is an element of the system of FIG. 1.

The microcomputer that is resident on controller board 10 is shown in greater detail in FIG. 2. As shown therein the computer comprises a microprocessor 100, an 8 MHz crystal oscillator 105, a latch 110, a random access memory (RAM) 120, a memory protection circuit 125, a read only memory (ROM) 130, serial communication module 16, an input protection and filtering circuit 140, an analog multiplexer 150, I/O expanders 160, 170, 180, a digital to analog circuit 190, a comparator 195, a sample and hold circuit 200, a set of switches 210, a wave-shaping circuit 215, output module 16, a communications multiplexer 240 and connectors 250 and 255.

Microprocessor 100 illustratively is an Intel 8039/8049 microprocessor. Latch 110 is a 373-type octal D-type flip-flop which controls an address bus 112 in response to a signal from microprocessor 100. Address bus 112 provides eight bits of address to RAM 120, ROM 130 and the communication module. Data from these units is returned to microprocessor 100 on an eight bit parallel data bus 114. RAM 120 is a pair of 5101-type 256×4 bit CMOS memory chips connected together to provide 256 bytes of random access storage. Two control lines from microprocessor 100 control the operation of writing into and reading from these chips. The data stored in RAM 120 includes all programming options and tuning parameters. The stored data is protected against power failure by a long-life battery in memory protection circuit 125. ROM 130 is three units of 2K×8 bit memory such as a 2716-type read only memory. Each ROM unit is addressed by the eight address lines of bus 112 and three additional address lines. Two additional lines plus control logic (not shown) select the individual ROM chip. The operating program for the controller is stored in ROM 130. In accordance with the invention, this program enables the controller to function as any one of the following seven types (or models) of controllers: a local/manual controller, a local/manual/remote controller; a local/manual/computer controller, an automatic/manual/direct digital control (ddc) controller, a local/manual/ratio controller, a cascade controller, or an auto select controller. Extensive details concerning these controllers are set forth below. The particular type of controller is determined by the positions of three of switches 210 which are read by microprocessor 100.

There are up to six analog inputs to the controller. Protection against voltage excursions and high-frequency transients is provided by input protection and filtering circuit 140. The filtered analog signals as well as a zero reference signal, a feedback signal from auxiliary board 30 and, optionally, output signals from sample and hold circuit 200 are applied to analog multiplexer 150. Multiplexer 150 illustratively is a 4051-type one-out-of-eight multiplexer whose output is selected by three of the lines from I/O expander 160 and whose operation is controlled by a fourth such line. The analog output of multiplexer 150 is converted to a digital signal by means of twelve bit digital-to-analog converter 190, comparator 195 and a standard analog-to-digital programming routine which is executed by microprocessor 100.

I/O expanders 160, 170, 180 are connected to microprocessor 100 via data bus 116 and select lines 118. I/O expander 170 provides for signal inputs from four digital inputs and 12 switches 210. The digital inputs are applied to I/O expander 170 from wave-shaping circuit 215 which comprises conventional level shifters and Schmitt triggers. The twelve switches are used to configure the software for various options. As noted above, three of the switches determine which of the seven types of controllers is operative on the controller board and front panel board. Additional switches permit the selection of one of four possible outputs from output module 14, the units (minutes or seconds, inverse or not) in which the PID constants are expressed, analog output range (1–5 volts or 0–5 volts), and features such as advanced tuning, computer signal type for the local/manual/computer and local/manual/ddc controllers and start-up mode.

I/O expander 180 provides for two digital inputs, four digital outputs as well as analog outputs through sample and hold circuit 200 and/or output module 14. In accordance with the position of two of switches 210, module 14 provides for the connection of one of four output modules to output lines OUT 1 and OUT 2: a pulse output module 222, stepper output module 224, a floating current output module 226, and a common ground output module 228. The stepper output module provides a two phase output of ±24 volt signals to drive a stepper motor. Software routines generate the phase shift for the desired direction as well as control the stepping frequency. The pulse output module provides raise and lower signals which can be used with solid state relays (not shown) to drive AC motors which open and close a valve, or with conventional electromechanical relays. The floating current output module provides an analog output voltage on output line OUT 1 and a floating current output of 4 to 20 milliAmps on output line OUT 2. The common ground output module provides an analog output voltage on output line OUT 1 and a common ground current output of 0 to 20 mA on output line OUT 2. In the absence of any output module, an analog voltage signal is present on output line OUT 1. The analog voltage signals from sample and hold circuit 200 may be fed back to microprocessor 100 through analog multiplexer 150 to compensate for drift and offset.

Communication multiplexer 240 is a 75138-type multiplexer which is used to multiplex incoming and outgoing clock and data signals. Connector 250 provides for the transmission of clock, data, raise and lower signals between the microprocessors of controller board 10, front panel board 20 and auxiliary board 30. The four bit bus to connector 250 of FIG. 2 is the same as the four bit communication bus of FIG. 1. This bus permits the controller board, front panel board and auxiliary board to be mounted either as an integral unit or for the front panel board to be separated by up to several hundred feet apart with no difference in the boards or their function. Connector 255 provides for the transmission of clock and data signals to and from the intelligent keyboard/display 12. The signals from keyboard/display 12 are therefore present on the communication bus and are processed by the microprocessors of the boards to which the bus is connected.

Figure 3:
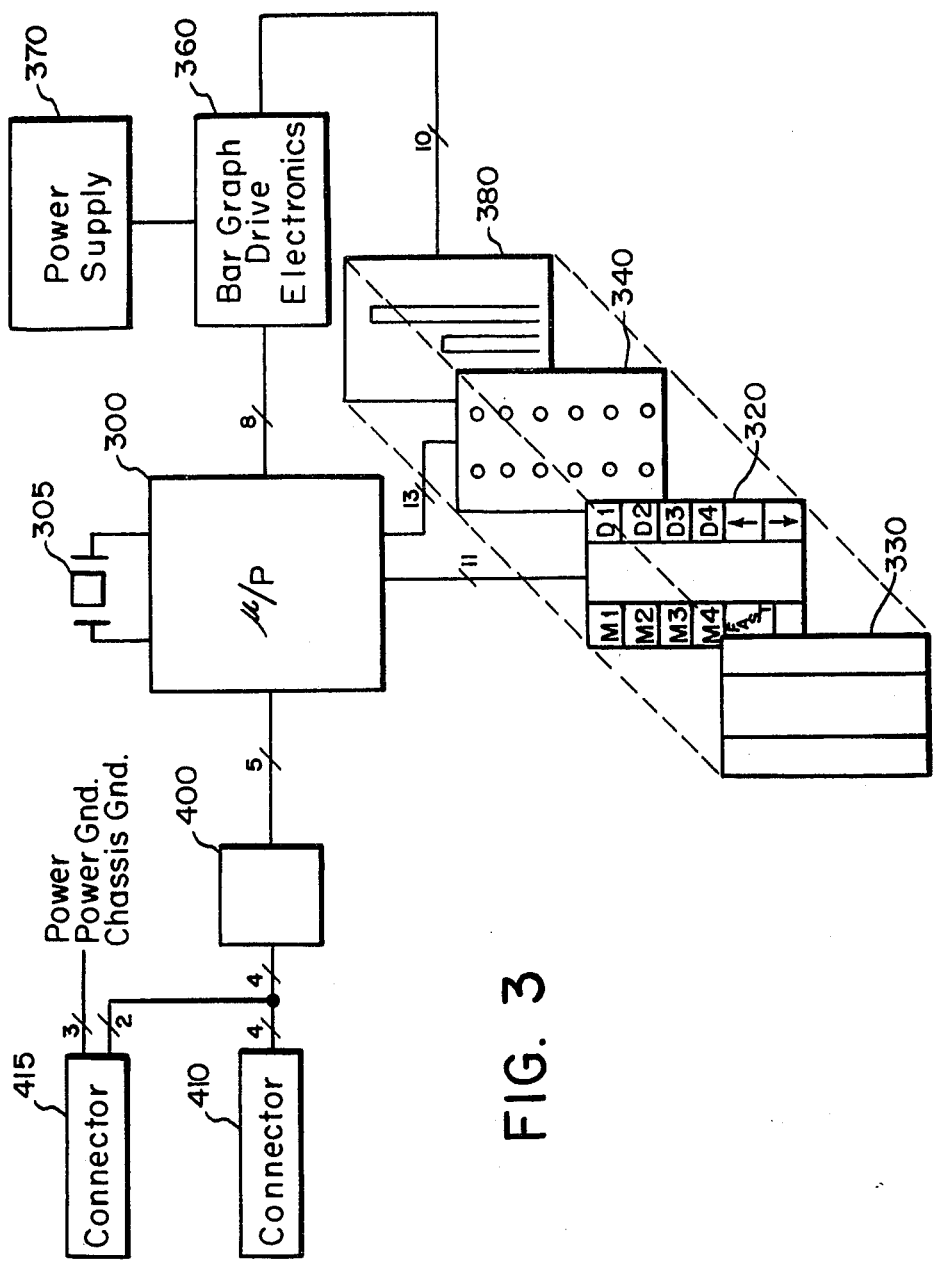
FIG. 3 is a schematic diagram of an illustrative embodiment of a front panel which is an element of the system of FIG. 1.

The microcomputer that is resident on front panel board 20 is shown in greater detail in FIG. 3. The computer comprises a microprocessor 300, a 6 MHz crystal oscillator 305, a switch panel 320, an overlay 330, an array of light emitting diodes (LEDs) 340, bar graph drive electronics 360, a bar graph power supply 370, a bar graph display 380, a communication multiplexer 400 and connectors 410, 415. Microprocessor 300 illustratively is an Intel 8748/8048 microprocessor. The microprocessor controls the reading of the switches of panel 320, their debouncing and the lighting of the LEDs. It also generates the timing signals for the bar graph display so that two variables can be shown. Likewise, it can receive data from and send data to controller board 10 and auxiliary board 30.

Front panel board 20 serves as the operator interface to the several different types or models of controllers which in accordance with the invention share the same hardware and software. Switch panel 320 contains eleven switches. Depending on the particular model of controller, up to four of these switches M1-M4 are available for selecting the operating mode of the controller such as LOCAL or MANUAL. Again depending on the model, up to four switches D1-D4 are available to select for display on the bar graph parameters such as process variable (PV), setpoint (SP), and output. Three switches are available for changing displayed variables provided the displayed variable is changeable and the front panel is in the correct mode. The RAISE switch ( ↑ ) will increase the variable at a rate of 1% per second; and the LOWER switch ( ↓ ) will decrease the variable at the same rate. The FAST switch will increase the slow speed to 15% per second. The array of light emitting diodes indicates the status of the switches of the switch panel as well as the availability of power (PWR) and the operating status of auxiliary board 30 (S/M). The diodes may be lighted directly by action of the switches or as shown in FIG. 3 under control of the microprocessor.

Illustratively, bar graph 380 is a commercially available dual 201 segment bar graph display such as the 12205 display available from Burroughs. Two variables are displayed simultaneously, the particular variables being selected by switches D1-D4. Drive electronics 360 and power supply 370 convert the low voltage level signal produced by microprocessor 300 to the high voltage level signals used by the bar graph display. Illustratively, power supply 370 is a 24 volt to 250 volt DC to DC converter. Multiplexer 400 and connectors 410, 415 are the same as multiplexer 240 and connectors 250, 255 of FIG. 2; and the four bit bus to connector 410 is the same as the four bit communication bus of FIG. 1. If desired, multiple front panels can be connected to controller board 10 via this communication bus.

Figure 4A:
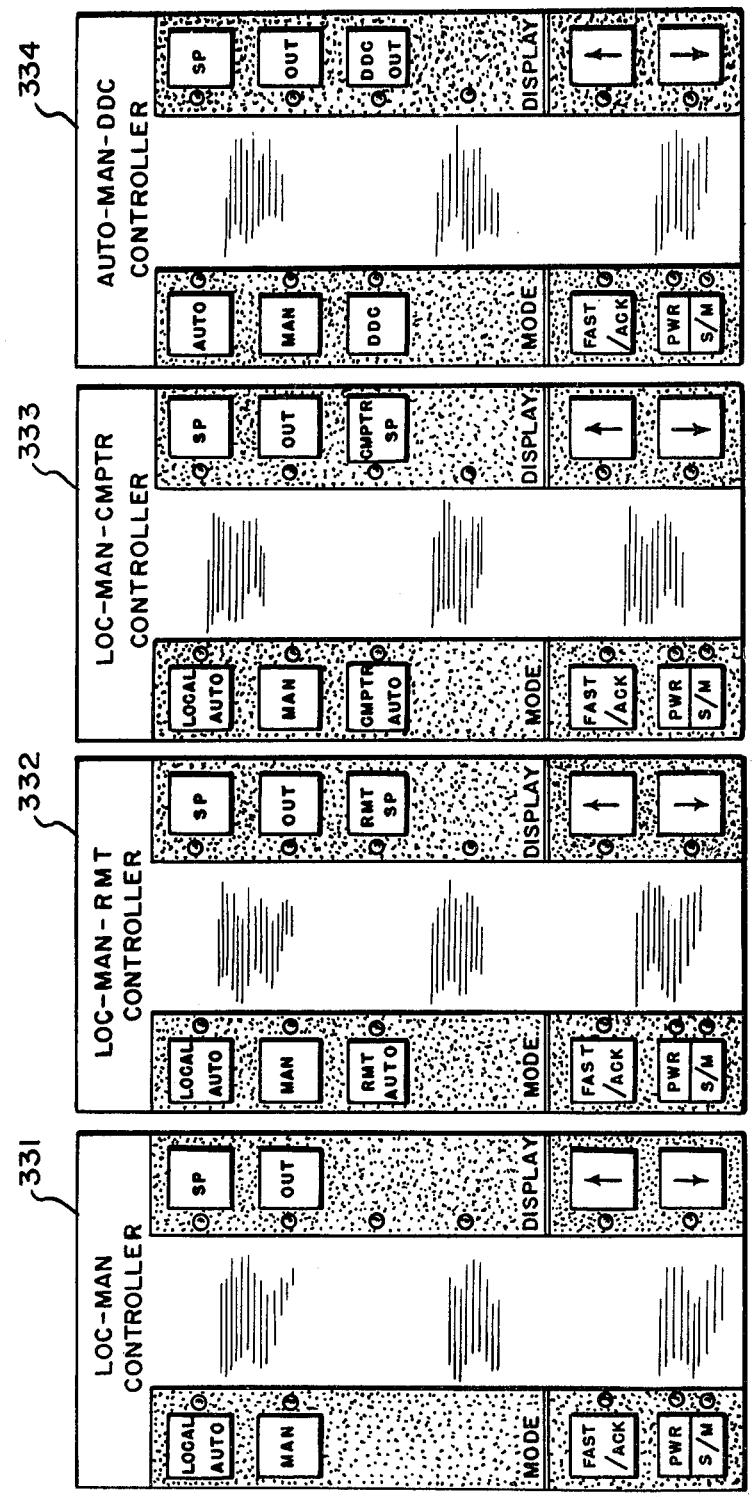
FIGS. 4A and 4B are a depiction of several illustrative overlays which may be used in conjunction with the front panel of FIG. 3.
Figure 4B:
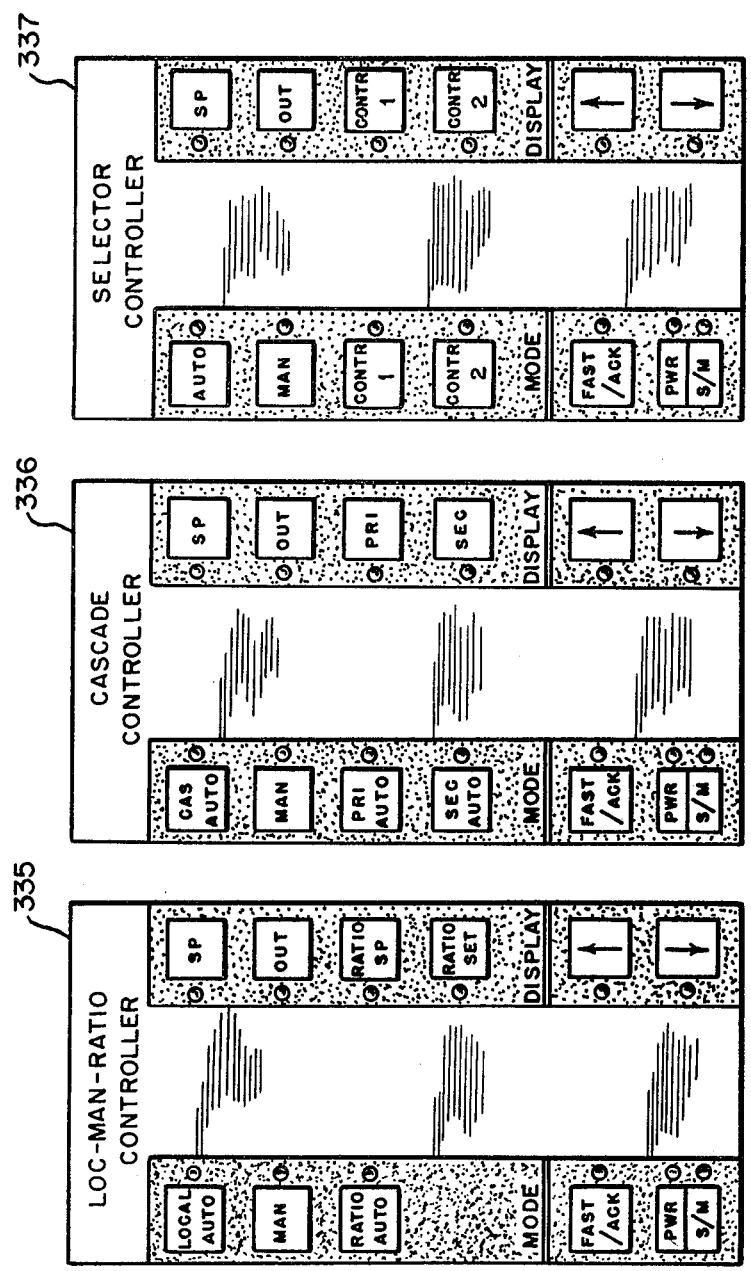

To identify the particular function of the switch and the type of controller, an overlay 330 is inserted on top of switch panel 320. FIGS. 4A and 4B depict the seven overlays 331-337 used for the seven types of controllers that controller board 10 and front panel 20 provide. The function of the switches shown in FIGS. 4A and 4B and their effect on the bar graph display is as follows.

Each of the seven types of controllers is able to operate in several different modes as set forth in Table 1.

TABLE 1

| Local Manual | Local Manual Remote | Local Manual Computer | Auto Manual DDC | Local Manual Ratio | Cascade | Auto Selector |
|---|---|---|---|---|---|---|
| SERVICE | SERVICE | SERVICE | SERVICE | SERVICE | SERVICE | SERVICE |
| MANUAL | MANUAL | MANUAL | MANUAL | MANUAL | MANUAL | MANUAL |
| LOCAL | LOCAL | LOCAL | AUTO | LOCAL | CASCADE | AUTO |
| AUTO | AUTO | AUTO | | AUTO | | |
| MANUAL | MANUAL | MANUAL | MANUAL | MANUAL | MANUAL | MANUAL |
| — | REMOTE | COMPUTER | DDC | RATIO | PRIMARY | CONTROLLER 1 |
| | AUTO | AUTO | | AUTO | AUTO | |
| — | — | — | — | — | SECONDARY AUTO | CONTROLLER 2 |

In the SERVICE MANUAL mode, the controller is not controlling the process. Its output, however, tracks the output of auxiliary board 30 which is providing manual outputs to the process. In the MANUAL mode, the controller's output is held at a constant value unless change is specified by a manual entry. The output value may be changed by the RAISE and LOWER switches of front panel board 20, by intelligent keyboard/display 22, or by signals received by the serial communications module 16. In the LOCAL AUTO mode, the proportional-integral-derivative (PID) algorithm is used to calculate the output value based on inputs representing the process variable (PV), the set point (SP), the valve position feed back (VPFB) and the PID constants. The REMOTE AUTO and RATIO AUTO modes are the same as the LOCAL AUTO mode except that the set point is externally generated. The COMPUTER AUTO mode is the same as the AUTO mode except that the set point is supplied by a computer. The DDC mode is the equivalent of the MANUAL mode in which an external computer is directly controlling a process through the output of a controller.

The cascade controller provides for automatic control of a process using two controllers. The output of a primary controller is a set point to a secondary controller and the output of the secondary controller is the output of the controller board to the process. The cascade auto (CAS AUTO) switch causes the cascade controller to operate in the CASCADE mode. When the primary auto (PRI AUTO) switch is activated to put the controller in the PRIMARY AUTO mode, just the primary controller is in operation and its output controls the process. This mode is used for tuning the primary controller. When the secondary auto (SEC AUTO) switch is activated to put the controller in the SECONDARY AUTO mode, just the secondary controller is in operation. This mode is used to tune the secondary controller and/or to provide a manual set point of the secondary controller thereby disabling cascade control.

In the auto selector controller, two controllers are used to perform PID control. Each controller has a process variable input, a local or remote set point and an output. In the AUTO mode, both controllers calculate outputs using the PID algorithm. Either the higher or the lower of the two outputs is connected to the outside world through output line OUT 1. In the MANUAL mode, output line OUT 1 is controlled by the raise and lower switches on the front panel. In controller 1 (CONTR 1) mode, controller 1 is connected to output line OUT 1 and provides automatic control. In the controller 2 (CONTR 2) mode, controller 2 is connected to output line OUT 1. When the controller is in the AUTO mode, the AUTO mode LED is lighted along with the LED associated with either the CONTROLLER 1 mode or the CONTROLLER 2 mode switch to indicate which controller's output is currently being provided to output line OUT 1.

For each of these controllers the operating mode is selected by one of the mode switches M1–M4 on switch panel 320. The LEDs associated with these switches indicate the mode select. The display switches D1–D4 control the variable displayed on the right bar of the bar graph display. The LEDs associated with these switches indicate which variable is displayed by the right bar of bar graph display 380. The slewing switches can, in certain instances, be used to vary the variable that is displayed on the right bar of the display. For each of the seven controllers, Table 2 indicates the switch settings which determine the operating mode, the display and the variable which can be slewed.

TABLE 2

| Switch Activated | Resultant Mode | Left Bar Display | Right Bar Display | Variable Subject to Slew |
|---|---|---|---|---|
| Local/Manual Controller | | | | |
| LOCAL-AUTO | LOCAL | PV | SP | SP |
| MAN | MANUAL | PV | Output | Output |
| SP | — | PV | SP | SP |
| OUT | — | PV | Output | Output (only if in MANUAL mode) |
| Local/Manual/Remote Controller | | | | |
| LOCAL-AUTO | LOCAL | PV | Local SP | Local SP |
| MAN | MANUAL | PV | Output | Output |
| RMT-AUTO | REMOTE | PV | Remote SP | None |
| SP | — | PV | Local SP | Local SP |
| OUT | — | PV | Output | Output (only if in MANUAL mode) |
| RSP | — | PV | Remote SP | None |
| Local/Manual/Ratio Controller | | | | |
| LOCAL-AUTO | LOCAL | PV | Local SP | Local SP |
| MAN | MANUAL | PV | Output | Output |
| RATIO-AUTO | AUTO (using Ratioed SP) | PV | Ratioed SP | None |
| SP | — | PV | Local SP | Local SP |
| OUT | — | PV | Output | Output (only if in MANUAL mode) |
| RATIO-SP | — | PV | Ratioed SP | None |
| RATIO-SET | — | Ratio | Ratioed SP | Ratio Value |
| Local/Manual/Computer Controller | | | | |
| LOCAL-AUTO | LOCAL | PV | Local SP | Local SP |
| MAN | MANUAL | PV | Output | Output |
| CMPTR-AUTO | COMPUTER SP | PV | Computer SP | None |
| SP | — | PV | Local SP | Local SP |
| OUT | — | PV | Output | Output (only if in MANUAL mode) |
| CSP | — | PV | Computer SP | None |

TABLE 2-continued

| Switch Activated | Resultant Mode | Left Bar Display | Right Bar Display | Variable Subject to Slew |
|---|---|---|---|---|
| Auto/Manual/DDC Controller | | | | |
| LOCAL-AUTO | AUTO | PV | Local SP | Local SP/REMOTE SP |
| MAN | MANUAL | PV | Output | Output |
| DDC | COMPUTER OUTPUT | PV | Computer Output | None |
| SP | — | PV | Local SP/REMOTE SP | |
| OUT | — | PV | Output | Output (only if in MANUAL mode) |
| DDC-OUT | — | PV | Compute Output | None |
| Cascade Controller | | | | |
| CAS-AUTO | CASCADE | PV1 | SP1 | SP1 |
| MAN | MANUAL | PV1 | Output | Output |
| PRI-AUTO | PRIMARY ONLY | PV1 | SP1 | SP1 |
| SEC-AUTO | SECONDARY ONLY | PV2 | SP2 | SP2 |
| SP | — | PV1 | SP1 | SP1 |
| OUT | — | PV1 | Output | Output (only if in MANUAL mode) |
| PRI | — | PV1 | SP1 | SP1 |
| SEC | — | PV2 | SP2 | SP2 |
| Auto Selector Controller | | | | |
| AUTO | AUTO SELECTOR | Active PV | Active SP | Active SP |
| MAN | MANUAL | Active PV | Output | Output |
| CONTR-1 | CONTROLLER 1 ACTIVE | PV1 | SP1 | SP1 |
| CONTR-2 | CONTROLLER 2 ACTIVE | PV2 | SP2 | SP2 |
| SP | — | Active PV | Active SP | Active SP |
| OUT | — | Active PV | Active Output | Output (only if in MANUAL mode) |
| CONTR-1 | — | PV1 | SP1 | SP1 |
| CONTR-2 | — | PV2 | SP2 | SP2 |

The controller 1 (CONTR 1) and controller 2 (CONTR 2) display LEDs are used to indicate which controller's process variable, setpoint and/or output are being displayed.

Figure 5:
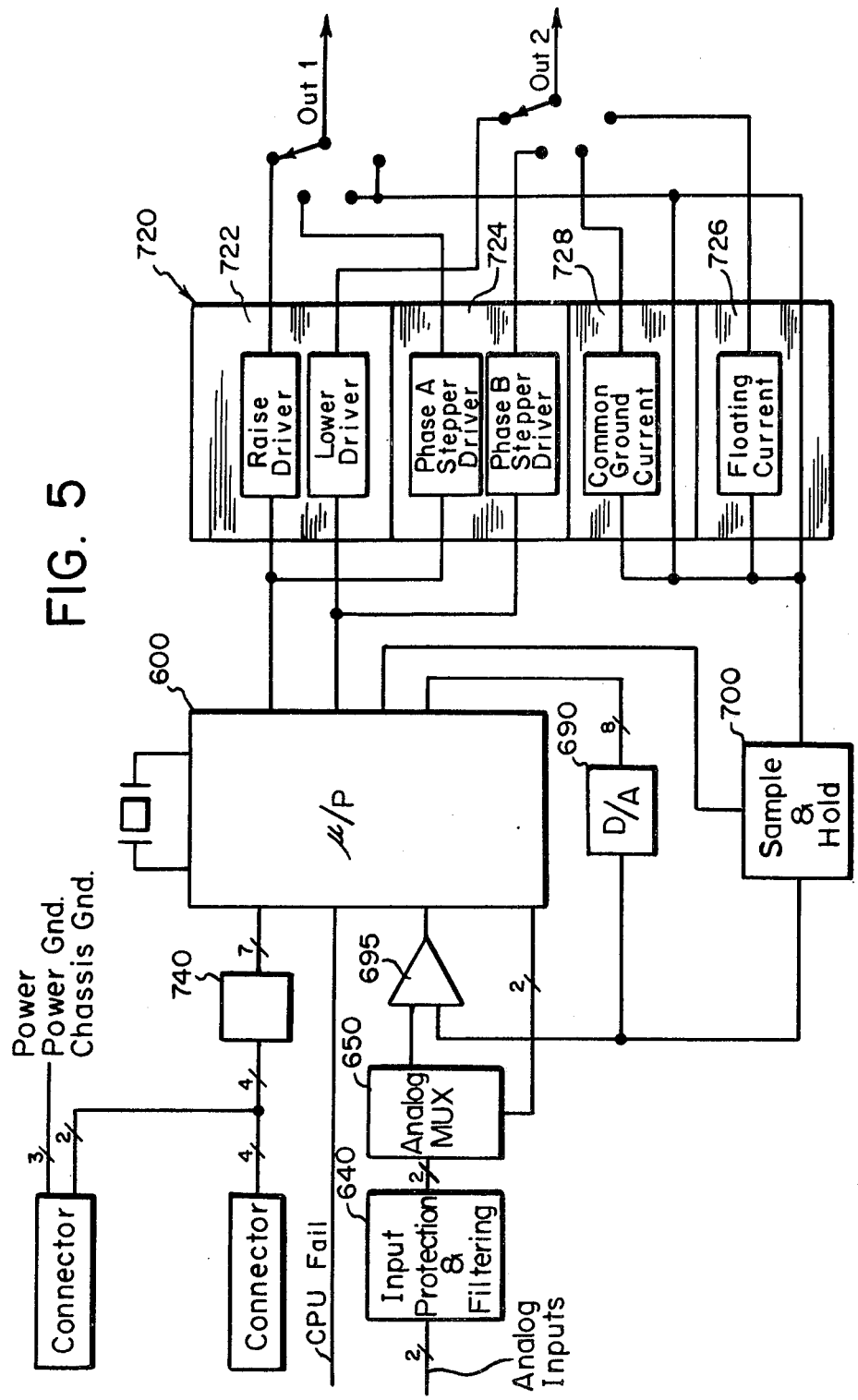
FIG. 5 is a schematic diagram of an illustrative embodiment of an auxiliary unit which is an element of the system of FIG. 1.

The microcomputer that is resident on auxiliary board 30 is depicted in greater detail in FIG. 5. The microcomputer comprises a microprocessor 600, an input protection and filtering circuit 640, an analog multiplexer 650, a digital-to-analog converter 690, a comparator 695, a sample and hold circuit 700, an output circuit 720, a communications multiplexer 740 and connectors 750, 755. As in the case of output module 14 on controller board 10, output circuit 720 can comprise pulse output circuit module 722, a stepper output circuit module 724, a floating current output circuit module 726 and a common ground current output circuit module 728, each of which produces output signals on output lines OUT 1 and OUT 2. The above-mentioned elements of FIG. 5 are all substantially the same as the corresponding elements of the controller of FIG. 2 and bear the same number incremented by 500. In contrast to the controller of FIG. 2, the auxiliary unit of FIG. 5 has only two analog inputs which preferably are a process variable and valve position feedback.

Auxiliary (or service/manual) board 30 provides a redundant manual output in the case of controller board failure or removal. Auxiliary board 30 has two modes of operation. Normally controller board 10 is in control of the process and the auxiliary board merely tracks the controller board's outputs and adjusts the analog outputs of the auxiliary board to the same value. Upon failure or removal of the controller board, the signal CPU fail is detected by microprocessor 600 which energizes relay 45 on mother board 40 to switch the output connection so that the signals on output lines OUT 1 and OUT 2 from the auxiliary board replace the signals on output lines OUT 1 and OUT 2 from the controller board. Since the auxiliary board was previously tracking the outputs of the controller board, this transfer is bumpless. If the controller board is operative while the auxiliary board is in control of the process, the controller board tracks the signals on output lines OUT 1 and OUT 2 from the auxiliary board so that bumpless transfer from the auxiliary board to the controller board can also be achieved.

While the auxiliary board is in control of the process, microprocessor 600 performs the following functions. A message is sent to the microprocessor 300 on front panel board 20 so as to turn on the light emitting diode (S/M) which indicates operation of the auxiliary board. The value of the process variable and the value of either the analog output from the auxiliary board or the valve position feedback are also digitized and sent to front panel board 20 for display on bar graph 380. In addition, the outputs from auxiliary board 30 are held at their value at the time of transfer of control from the controller board to the auxiliary board unless these values are changed by slewing commands entered via intelligent keyboard/display 32 or front panel board 20.

Figure 6:
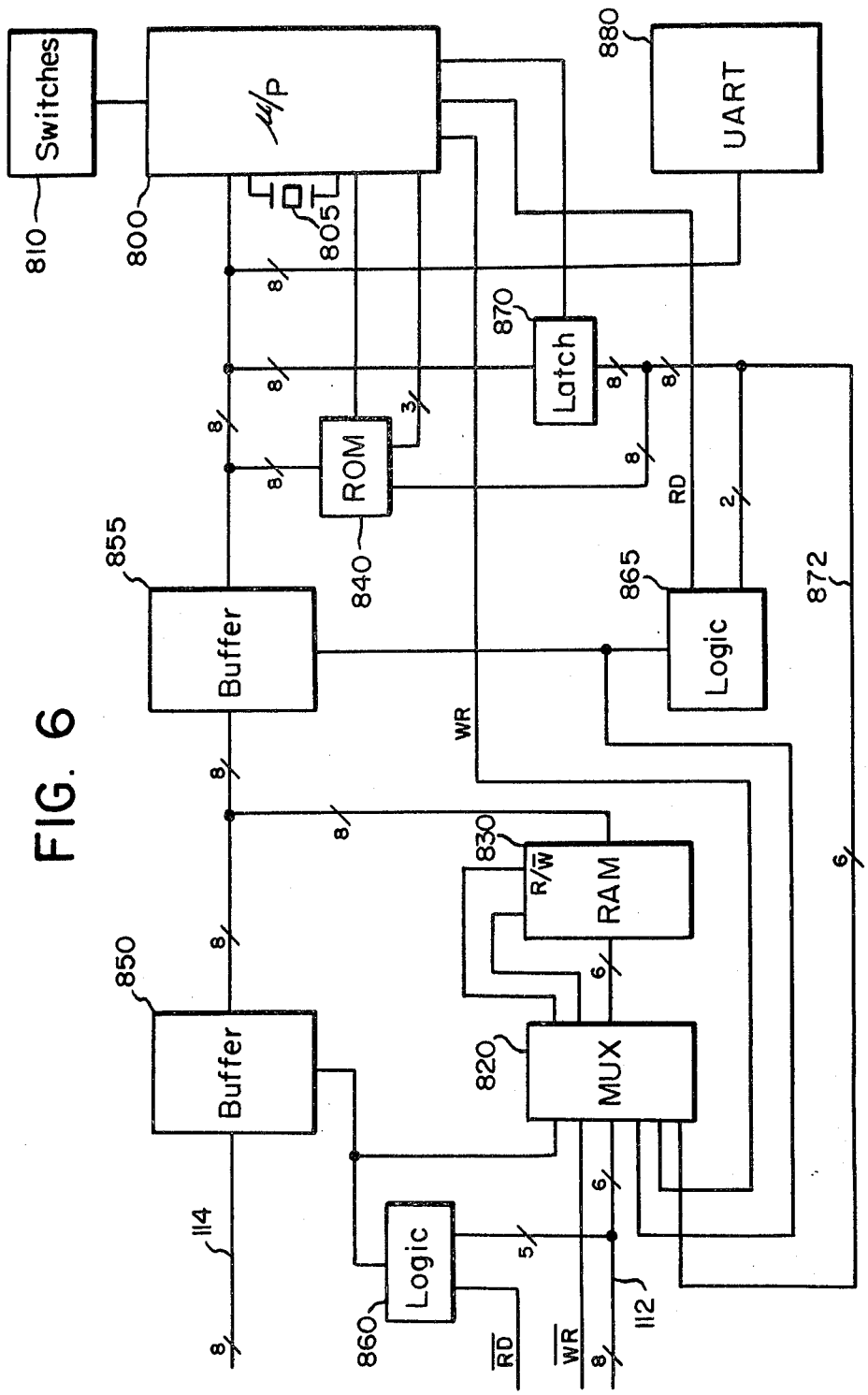
FIG. 6 is a schematic diagram of an illustrative embodiment of a serial communication module which is an element of the System of FIG. 1.

A schematic diagram of communication module 16 is set forth in FIG. 6. As shown therein, the apparatus comprises a microprocessor 800, an array of switches 810, a multiplexer 820, a random access memory (RAM) 830, a read only memory (ROM) 840, bi-directional buffers 850, 855, control logic 860, 865, a latch 870 and a universal asynchronous receiver transmitter (UART) 880. The communication module is connected to controller board 10 via address bus 112, data bus 114 and the $\overline{WR}$ and $\overline{RD}$ control lines shown on the left hand side of FIG. 6. Two additional control lines (not shown) are used for handshaking between the controller board and the communication module.

Microprocessor 800 illustratively in an 8039/8049 Intel microprocessor with a six Mhz clock crystal 805. Various control options can be set for the microprocessor by means of eight DIP switches 810. Multiplexer 820 is illustratively a pair of 157-type quad two-input multiplexers which provide to RAM 830 either a six bit address furnished from the controller board or a six bit address supplied by the communication module. RAM 830 illustratively is a 6810 memory chip which provides up to 128 bytes of random access storage which are used to exchange data between the controller board and the communication module. The read/write operation for RAM 830 may be controlled either from the controller board via the $\overline{WR}$ line and control logic 860 or from microprocessor 800 via the $\overline{WR}$ line and control logic 865. Logic 860, 865 also controls the operation and the direction of signal flow through bi-directional buffers 850, 855 which illustratively are 245-type buffers.

Latch 870 is a 373-type octal D-type flip-flop which controls an address bus 872 in response to a signal from microprocessor 800. The signal on address bus 872 provides the alternative address to RAM 830 via multiplexer 820. The signal on line 872 also provides eight bits of address to ROM 840. ROM is two units of 2K×8 bit memories such as a 2716-type read only memory. Each unit is addressed by the eight address lines of bus 872 and three additional address lines from microprocessor 800. An enable signal from the microprocessor enables one or the other of these units. ROM 840 stores the operating program for the communications module.

UART 880 illustratively is an 8250 serial to parallel interface. It produces a serial data output signal along with conventional EIA-type request to send and data terminal ready signals. It can receive a serial data signal from a communication channel and can respond to the EIA-type clear to send and data set ready signals. Because of the microprocessor control of the communication module, the data transmission rate can be programmed into the module by the intelligent keyboard/display. Rates of 110, 150, 300, 600, 1200, 2400, 4800 or 9600 Baud can be selected. In addition, one or two stop bits, the use of a parity check and odd or even parity can be selected.

Figure 7:
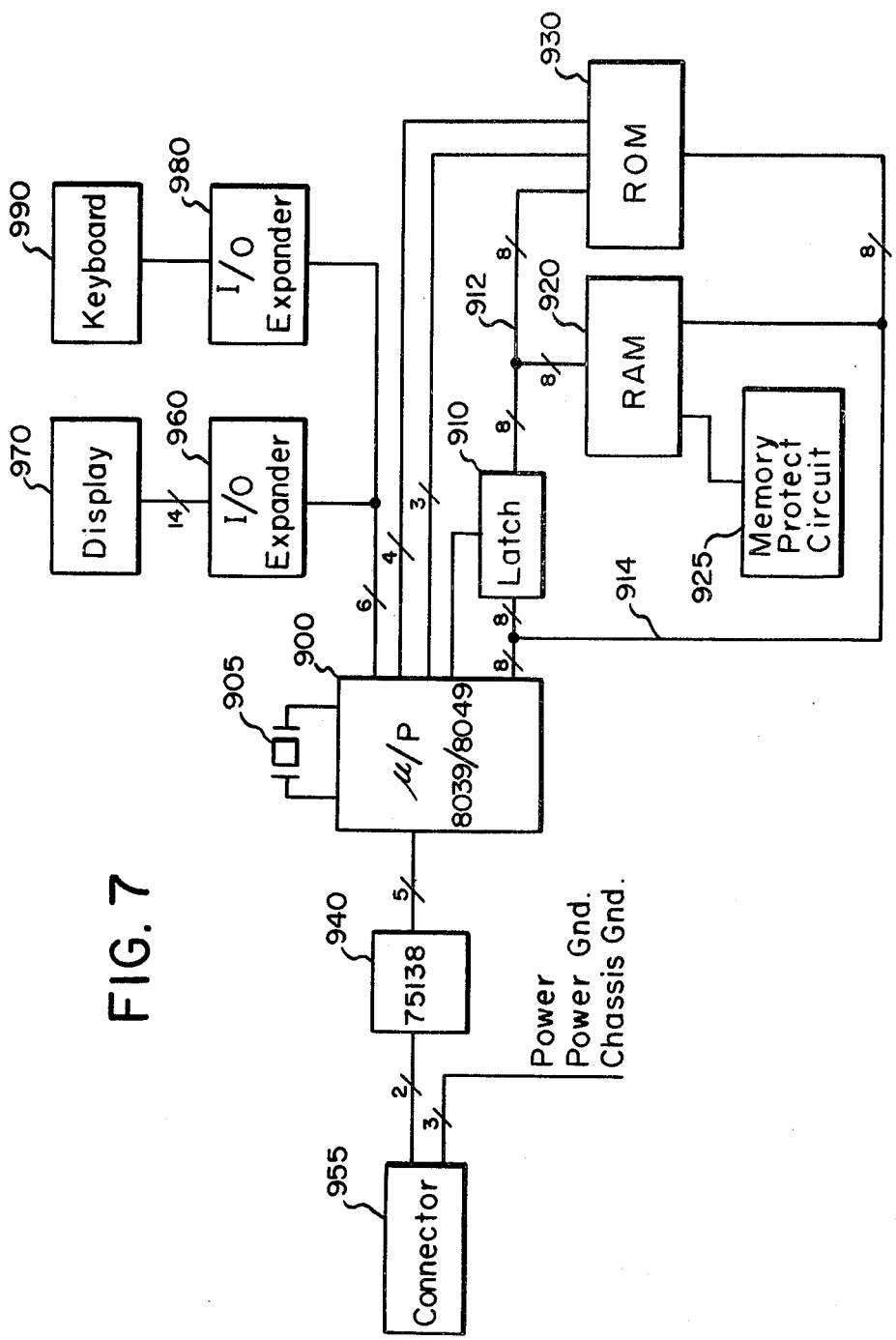
FIG. 7 is a schematic diagram of an illustrative embodiment of an intelligent keyboard/display which is an element of the system of FIG. 1.

A schematic diagram of any one of intelligent keyboard displays 12, 22, 32 is set forth in FIG. 7. As shown thereon, the keyboard display comprises a microprocessor 900, a latch 910, a random access memory (RAM) 920, a memory protection circuit 925, a read only memory (ROM) 930, I/O expanders 960, 980, a display 970 and a keyboard 990. In addition, the keyboard display comprises a communication multiplexer 940 and a connector 955.

Illustratively, microprocessor 900 is an 8039/8049 Intel microprocessor with a six Mhz clock crystal 905. Latch 910 is a 373-type octal D-type flip-flop which controls an address bus 912 in response to a signal from microprocessor 900. Address bus 912 provides eight bits of address to RAM 920 and ROM 930. Data from these units is returned to microprocessor 900 on an eight bit parallel data bus 914. RAM 920 is a pair of 5101-type 256×4 bit CMOS memory chips connected together to provide 256 bytes of random access storage. Two control lines from microprocessor 900 control the operation of writing into and reading from these chips. RAM 920 permits data to be copied between the intelligent keyboard/display and an SLC instrument such as a controller or a recorder. The stored data is protected against power failure by a long-life battery in memory protection circuit 925. ROM 930 is four units of 2K×8 bit memory such as a 2716-type read only memory. Each ROM unit is addressed by the eight address lines of bus 912 and three additional address lines. Four additional lines selected the individual ROM chip. The operating program for the intelligent keyboard/display is stored in ROM 930. This program scans keyboard 190, debounces the signal from a key and generates a code for the particular key depressed. It also provides for the display of one or more characters at specified positions on display 970. Further the program generates the timing signals and controls required to send and receive serial data through connector 955.

I/O expanders 960, 980 are 8243-type coder/decoders capable of producing an output signal on one of sixteen lines on the decoded side of the expander in accordance with a four bit signal received on the coded side and capable of producing a four bit coded output signal on the coded side of the expander in response to a signal received on one of sixteen lines on the uncoded side of the expander. I/O expander 960 provides an interface to display 970; and I/O expander 980 provides an interface to keyboard 990. Display 970 is an eight character alphanumeric display which illustratively is supplied by a pair of Litronics DL1414 display chips. Keyboard 990 is nine row by five column Texas Instruments keyboard. Communications multiplexer 940 is similar to communication multiplexers 240, 400 and 740 of the controller board, front panel board and auxiliary board; and connector 955 is adapted to mate with connectors 255, 415 and 755 shown in FIGS. 2, 3 and 5.

The intelligent keyboard/display of FIG. 7 provides a means of reading data from and entering data into any one of the controller board, the front panel board and the auxiliary board. Of particular interest, the keyboard/display provides a means for displaying many of the numerous variables which are generated by the microprocessors on those boards or are received as inputs at those boards. In addition, the keyboard/display provides a means for selecting many different operating options of the programs stored on these boards as well as a means for overriding certain input signals. Thus, the keyboard/display has the ability to alter the configuration of the individual controllers selected by three of panel switches 320. The keyboard/display also has the capability of reading and storing the operating configuration of the controller. The configuration can then be read out from the keyboard/display.

To read data from or enter data into a unit, the keyboard/display is first initialized by plugging it into the unit. The keyboard/display will then determine what instrument and model it has been plugged into and will display some unique identifier such as LMR for an L-M-R controller, RECORDER for a recorder, etc. The keyboard/display will then enter an operating mode in which the keys of keyboard 990 have functions that are particularly suited for interaction with the control instrument to which it is connected. For a controller, the keyboard has the labels shown in Table 3. The function of each of these keys is defined in the above-referenced "Intelligent Keyboard/Display".

To examine any accessible variables, options, etc. the READ function of the keyboard/display is used. One, two or three keystrokes are used to identify the desired variable. A "lower case" key requires one keystroke. Examples are SP for setpoint and OUT for the output. "Upper case" keys require the SHIFT key to be pressed before the variable keystroke. An example is SHIFT DEV for deviation. Finally, some variables are subscripted; these require a number to be entered. Examples of these are DO 2 for the second digital output and SHIFT AI 6 for analog input number 6. When a subscripted key is pressed, an underline symbol is displayed to prompt the user. If no number is entered, 1 is automatically used. Otherwise, the appropriate number key should be depressed. As the keys are pressed, the display will display the keystroke. This is called the ID or identifier hereinafter.

TABLE 3

| IN OP | LIN OP | FLTR | DI | AI |
|---|---|---|---|---|
| SP | L/R SP | LSP | RSP | TRK OP |
| RAT MAX | L/R RAT | L RAT | L RAT | IN SP |
| SRC OP | FAIL OP | SAFE SP | RSP HL | RSP LL |
| PV1 OP | PID OP | PV ALM | DEV | DEV1 ALM |
| PV | $K_P$ | $K_I$ | $K_D$ | TV |
| TV OP | P OP | I OP | D OP | TV BKPT |
| FF OP | FF IN | FF k | FF OUT | AO 3 |
| DB | INHB OP | OUT OP | A03 OP | OUT3 OP |
| D03 OP | VPFB | OUT | DO | DDC OUT |
| H OVR OP | L OVR OP | OUT HL | OUT LL | H/L SEL |
| H OVR | L OVR | 7 | 8 | 9 |
| ID | | COMM | ALM ACK | MODE |
| NEXT | | 4 | 5 | 6 |
| ENTER | | EU 0% | EU 100% | EU ID |
| READ | | 1 | 2 | 3 |
| | | AUTH | UNITS | DIAG |
| CLR | SHIFT | 0 | . | +/− |

After the variable has been selected, the READ key is pressed. The intelligent keyboard then obtains the requested data from the SLC instrument and displays it as follows:

=n n n n n n I

The equal sign, =, means that the value displayed is the current value. The next 6 characters (nnnnnn) may be numeric or alphanumeric depending on the variable. The last character, I, is a special identifier used with numeric values. The final key associated with the read function is ID. This key will display the identifier of the currently displayed variable on the display. For example, if a local setpoint value is displayed and ID is pressed, the display will change to LSP.

The ENTER function is used to change various values, options, etc. in the SLC instruments. To enter a new value, the variable must first be read and displayed as above.

To change a numeric value the following procedure is used:
1. Press CLEAR. A zero is displayed.
2. Use the numeric keys (0 through 9, decimal point and +/−) to enter the new value. Up to 4 digits may be entered.
3. Press SHIFT ENTER. An equal sign = will be displayed to the left of the value (after a short delay) indicating that the new value was entered into the SLC instrument.

The intelligent keyboard also has a slewing feature which performs 2 distinct functions: changing numeric variables, and selecting non-numeric variables. Two keys, raise, ↑, and lower, ↓, are used for slewing.

For numeric slewing any changeable numeric value may be slewed. The advantage of slewing over entry of a new value is that a large bump is prevented. The rate at which the variable is slewed depends on the type of variable, its current value and the activity on the system's communication bus. By pressing the SHIFT key along with raise, ↑, or lower, ↓, the variable will slew at 15 times the slow slew rate.

Certain keys refer to features and options that can have several possible states. When the appropriate key is pressed to display such a feature or option, the display will be:

= a a a a a a x, where a a a a a a is a 1 to 6 character identifier for the section and x is either a blank if the identifier refers to the currently active state of the feature or option or a question mark if the identifier refers to an alternative state. To change the setting, the slew keys are used to get the desired option into the display. Next, SHIFT and ENTER are pressed. After a short delay, the question mark will disappear to indicate that the setting has been selected.

For example, the Controller's analog output #3 may be used for output, setpoint (SP), process variable (PV) or be turned off. Suppose it is set for output but PV is desired. The user may press the following key sequence:

| Keystroke Sequence | Sequence | Comments |
|---|---|---|
| SHIFT | — | |
| AO3OP | AO3 OP | keystroke is displayed |
| READ | = OUT | currently active variable is displayed |
| ↓ | = OFF? | another choice (note the ?) is displayed |
| ↓ | = OFF? | since the OFF option is at the end of the stored table of options the display remains the same |
| ↑ | = OUT | current setting (note absence of the ?) is displayed as display moves in the other direction in the stored table of options |
| ↑ | = SP? | another choice is displayed |
| ↑ | = PV? | another choice is displayed |
| SHIFT ENTER | = PV | PV is selected for display and the question mark disappears indicating the change has been made. |

Extensive details concerning the operation of the keyboard/display are set forth in the above referenced application "Intelligent Keyboard/Display".

The foregoing elements can be configured in numerous ways to define any one of the seven types of controllers described above and to provide numerous options and features. Some of these features will be apparent from the following Table 4 which lists the analog and digital inputs and outputs to the seven types of controller and from the discussion of FIGS. 8–17 which provide a software block diagram for the controller.

TABLE 4

| LEADS | INPUT & OUTPUT SIGNALS |
|---|---|
| LOCAL/MANUAL CONTROLLER | |
| AI 1 | Main Process Variable (PV1) |
| AI 2 | not used |
| AI 3 | Feed Forward (FF) or Second Process Variable (PV1 A) |
| AI 4 | Override Low (OVL) |
| AI 5 | Override High (OVH) or Tuning Variable (TV) |
| AI 6 | Valve Position Feedback (VPFB) |
| DI 1 | not used |
| DI 2 | Manual Mode Select (MAN) |
| DI 3 | Local Mode Select (LOC) |
| DI 4 | not used |
| DI 5 | Tuning Breakpoint 1 (TB1) or Inhibit Raise (INH R) |
| DI 6 | Tuning Breakpoint 2 (TB2) or Inhibit Lower (INH L) |
| OUT 1 | Voltage Output (AO1) or Stepper Phase A or Raise (DO1) |
| OUT 2 | Current Output (AO2) or Stepper Phase B or Lower (DO2) |
| AO 3 | Setpoint Feedback (SPFB) or Process Variable (PV1) or Controller Output (CO) |
| DO 3 | Process Variable Alarm (ALM) |
| DO 4 | Local Mode Indication (LOC) |
| DO 5 | Manual Mode Indication (MAN) |
| DO 6 | not used |
| DO 7 | Auxiliary Mode Indication |
| DO 8 | Failure Alarm |
| LOCAL/MANUAL/REMOTE CONTROLLER | |
| AI 1 | Main Process Variable (PV1) |
| AI 2 | Remote Setpoint (RSP) |
| AI 3 | Feed Forward (FF) or Second Process Variable (PV1A) |
| AI 4 | Override Low (OVL) |
| AI 5 | Override High (OVH) or Tuning Variable (TV) |
| AI 6 | Valve Position Feedback (VPFB) |
| DI 1 | not used |
| DI 2 | Manual Mode Select (MAN) |
| DI 3 | Local Mode Select (LOC) |
| DI 4 | Remote Mode Select (RMT) |
| DI 5 | Tuning Breakpoint 1 (TB1) or Inhibit Raise (INH.R) |
| DI 6 | Tuning Breakpoint 2 (TB2) or Inhibit Lower (INH.L) |
| OUT 1 | Voltage Output (AO1) or Stepper Phase A or Raise (DO1) |
| OUT 2 | Current Output (AO2) or Stepper Phase B or Lower (DO2) |
| AO 3 | Setpoint Feedback (SPFB) or Process Variable (PV1) or Controller Output (CO) |
| DO 3 | Process Variable Alarm (ALM) |
| DO 4 | Local Mode Indication (LOC) |
| DO 5 | Manual Mode Indication (MAN) |
| DO 6 | Remote Mode Indication (RMT) |
| DO 7 | Auxiliary Mode Indication |
| DO 8 | Failure Alarm (F. ALM) |
| LOCAL/MANUAL/COMPUTER CONTROLLER | |
| AI 1 | Main Process Variable (PV1) |
| AI 2 | Computer Setpoint (CSP) |
| AI 3 | Feed Forward (FF) or Second Process Variable (PV1A) |
| AI 4 | Override Low (OVL) |
| AI 5 | Override High (OVH) or Tuning Variable (TV) |

TABLE 4-continued

| LEADS | INPUT & OUTPUT SIGNALS |
|---|---|
| AI 6 | Valve Position Feedback (VPFB) |
| DI 1 | Computer Failure (CF) |
| DI 2 | Manual Mode Select (MAN) |
| DI 3 | Local Mode Select (LOC) or Inhibit Raise (INH R) |
| DI 4 | not used |
| DI 5 | Raise (R) or Accept (A) or Tuning Breakpoint 1 (TB1) |
| DI 6 | Lower (L) or Tuning Breakpoint 2 (TB2 ) |
| OUT 1 | Voltage Output (AO1) or Stepper Phase A or Raise (DO1) |
| OUT 2 | Current Output (AO2) or Stepper Phase B or Lower (DO2) |
| AO 3 | Computer Setpoint Feedback (SPFB) |
| DO 3 | Process Variable Alarm (ALM) |
| DO 4 | Local Mode Indication (LOC) |
| DO 5 | Manual Mode Indication (MAN) |
| DO 6 | Computer Mode Indication (CMP) |
| DO 7 | Auxiliary Mode Indication |
| DO 8 | Failure Alarm (F. ALM) |
| AUTOMATIC/MANUAL/DDC CONTROLLER | |
| AI 1 | Main Process Variable (PV1) |
| AI 2 | Remote Setpoint (RSP) |
| AI 3 | Feed Forward (FF) or Second Process Variable (PV1A) |
| AI 4 | Computer Output (C.OUT) or Override Low (OVL) |
| AI 5 | Override High (OVH) or Tuning Variable (TV) |
| AI 6 | Valve Position Feedback (VPFB) |
| DI 1 | Computer Failure (CF) |
| DI 2 | Manual Mode Select (MAN) |
| DI 3 | Auto Mode Select (AUTO) or Inhibit Raise (INH R) |
| DI 4 | DDC Mode Select (DDC) or Inhibit Lower (INH L) |
| DI 5 | Raise (R) or Accept (A) or Tining Breakpoint 1 (TB1) |
| DI 6 | Lower (L) or Tuning Breakpoint 2 (TB2) |
| OUT 1 | Voltage Output (AO1) or Stepper Phase A or Raise (DO1) |
| OUT 2 | Current Output (AO2) or Stepper Phase B or Lower (DO2) |
| AO 3 | Setpoint Feedback (SPFB) or Process Variable (PV1) or Controller Output (CO) |
| DO 3 | Process Variable Alarm (ALM) |
| DO 4 | Auto Mode Indication (AUTO) |
| DO 5 | Manual Mode Indication (MAN) |
| DO 6 | DDC Mode Indication (DDC) |
| DO 7 | Auxiliary Mode Indication |
| DO 8 | Failure Alarm (F. ALM) |
| LOCAL/MANUAL/RATIO CONTROLLER | |
| AI 1 | Main Process Variable (PV1) |
| AI 2 | Signal to be "Ratioed" (INPUT) |
| AI 3 | Feed Forward (FF) or Second Process Variable (PV1A) or Remote Ratio (RR) |
| AI 4 | Override Low (OVL) |
| AI 5 | Override High (OVH) or Tuning Variable (TV) |
| AI 6 | Valve Position Feedback (VPFB) |
| DI 1 | not used |
| DI 2 | Manual Mode Select (MAN) |
| DI 3 | Local Mode Select (LOC) |
| DI 4 | Ratio Mode Select (RAT) |
| DI 5 | Tuning Breakpoint 1 (TB1) or Inhibit Raise (INH R) |
| DI 6 | Tuning Breakpoint 2 (TB2) or Inhibit Lower (INH L) |
| OUT 1 | Voltage Output (AO1) or Stepper Phase A or Raise (DO1) |
| OUT 2 | Current Output (AO2) or Stepper Phase B or Lower (DO2) |
| AO 3 | Setpoint Feedback (SPFB) or Process Variable (PV1) or |

TABLE 4-continued

| LEADS | INPUT & OUTPUT SIGNALS |
|---|---|
| DO 3 | Controller Output (CO) Process Variable Alarm (ALM) |
| DO 4 | Local Mode Indication (LOC) |
| DO 5 | Manual Mode Indication (MAN) |
| DO 6 | Ratio Mode Indication (RAT) |
| DO 7 | Auxiliary Mode Indication |
| DO 8 | Failure Alarm (F. ALM) |
| CASCADE CONTROLLER | |
| AI 1 | Primary Process Variable (PV1) |
| AI 2 | Secondary Process Variable (PV2) |
| AI 3 | Feed Forward (FF) or Second Primary Process Variable (PV1A) |
| AI 4 | Override Low (OVL) |
| AI 5 | Override High (OVH) or Tuning Variable (TV) |
| AI 6 | Valve Position Feedback (VPFB) |
| DI 1 | Secondary Mode Select (SEC) |
| DI 2 | Manual Mode Select (MAN) |
| DI 3 | Cascade Mode Select (CAS) |
| DI 4 | Primary Mode Select (PRI) |
| DI 5 | Tuning Breakpoint 1 (TB1) or Inhibit Raise (INH R) |
| DI 6 | Tuning Breakpoint 2 (TB2) or Inhibit Lower (INH L) |
| OUT 1 | Voltage Output (AO1) or Stepper Phase A or Raise (DO1) |
| OUT 2 | Current Output (AO2) or Stepper Phase B or Lower (DO2) |
| AO 3 | Primary Controller Output (PO) or Setpoint (SPFB) or Primary Process Variable (PV1) |
| DO 3 | Process Variable Alarm (ALM) or Secondary Mode Indication (SEC) |
| DO 4 | Cascade Mode Indication (CAS) |
| DO 5 | Manual Mode Indication (MAN) |
| DO 6 | Primary Mode Indication (PRI) |
| DO 7 | Auxiliary Mode Indication |
| DO 8 | Failure Alarm (F. ALM) |
| AUTO SELECTOR CONTROLLER | |
| AI 1 | Process Variable #1 (PV1) |
| AI 2 | Remote Setpoint #1 (RSP 1) |
| AI 3 | Feed Forward (FF) or Second Process Variable #1 (PV1A) (for function) |
| AI 4 | Process Variable #2 (PV2) |
| AI 5 | Remote Setpoint #2 (RSP2) or Tuning Variable (TV) |
| AI 6 | Valve Position Feedback (VPFB) |
| DI 1 | Controller 2 Mode Select (CON 2) |
| DI 2 | Manual Mode Select (MAN) |
| DI 3 | Auto Select Mode Select (AUTO) |
| DI 4 | Controller 1 Mode Select (CON 1) |
| DI 5 | Tuning Breakpoint 1 (TB1) or Inhibit Raise (INH R) |
| DI 6 | Tuning Breakpoint 2 (TB2) or Inhibit Lower (INH L) |
| OUT 1 | Voltage Output (AO1) or Stepper Phase A or Raise (DO1) |
| OUT 2 | Current Output (AO2) or Stepper Phase B or Lower (DO2) |
| AO3 | Active Setpoint Feedback (SPFB) or Non-Selected Controller Outputs (N.CO) |
| DO 3 | Process Variable Alarm (ALM) or Controller 2 Mode (CON 2) |
| DO 4 | Auto Select Mode Indication (AUTO) |
| DO 5 | Manual Mode Indication (MAN) |
| DO 6 | Controller 1 Mode Indication (CON 1) |
| DO 7 | Auxiliary Mode Indication |
| DO 8 | Failure Alarm (F. ALM) |

Block diagrams depicting the software that is used by the controller board to control a process are set forth in FIGS. 8-17. Throughout these figures a number in a triangle is used to indicate the source of certain control inputs or to provide comments about the signal. The number 1 indicates that the source is the intelligent keyboard/display or the serial communication module. The key on the keyboard of the keyboard-display which controls the input is identified in brackets. The number 2 indicates that the signal is derived from switch panel 320 on front panel board 20. The number 3 indicates that the input is derived from one or more of panel switches 210 on control board 10. The number 4 indicates that the signal is one of the analog or digital inputs or outputs to the system. The number 5 indicates that the signal in question is a read only signal that is readable by the keyboard/display using the key indicated in brackets. Where a choice is to be made between two or more inputs in a software routine, the choice is indicated by a large vertical oval. Appended to a line at the top or bottom of the oval is a legend which indicates the key and/or signal which selects each one of the inputs to the oval. The legends are in the same order as the signal inputs which they select.

All active inputs are read and processed at the controller's loop processing rate, which may be up to ten times per second. Inputs are normally processed regardless of whether they will actually be used by the controller but improved control response may be possible if unused inputs are made inactive.

Figure 8:
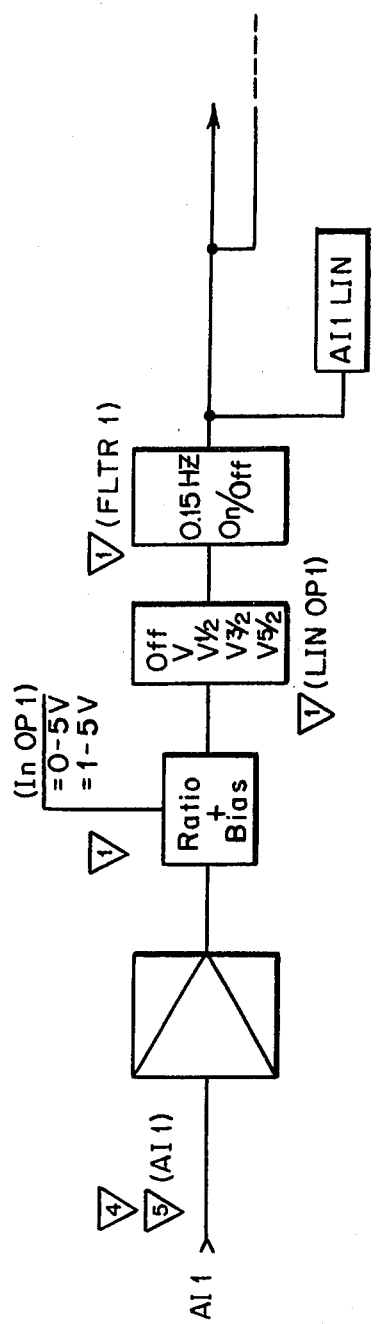
FIGS. 8 through 17 are block diagrams of software used in the system of FIG. 1.

FIG. 8 depicts the software processing performed by one of the analog inputs to the controller. The same processing is performed on the other five. Each analog input goes through a 1.5 Hz hardware filter to eliminate electrical noise in input protection and filtering circuit 140. Thereafter the signal is digitized by a high speed successive approximation method having a resolution of twelve bits. Keyboard entries IN OP 1 through IN OP 6 of keyboard/display 12 specify an input signal range of either 0-5 V or 1-5 V for each of the six analog inputs. The input signal is then ratioed so that the value passed on to the next software processing block has a range of 0.000 to 1.000, corresponding to 0% and 100%. Each analog input can be subjected to one of four linearization algorithms selected by use of the keyboard inputs LIN OP 1 through LIN OP 6. These algorithms are standard zero and scale linearization, square root linearization, three-halves linearization, and five-halves linearization. Next, each linearized analog input may be filtered by an 0.15 Hz filter as specified by keyboard entries FLTR 1 through 6. Six analog input signals are then made available to the other operating blocks of the controller.

Figure 9:
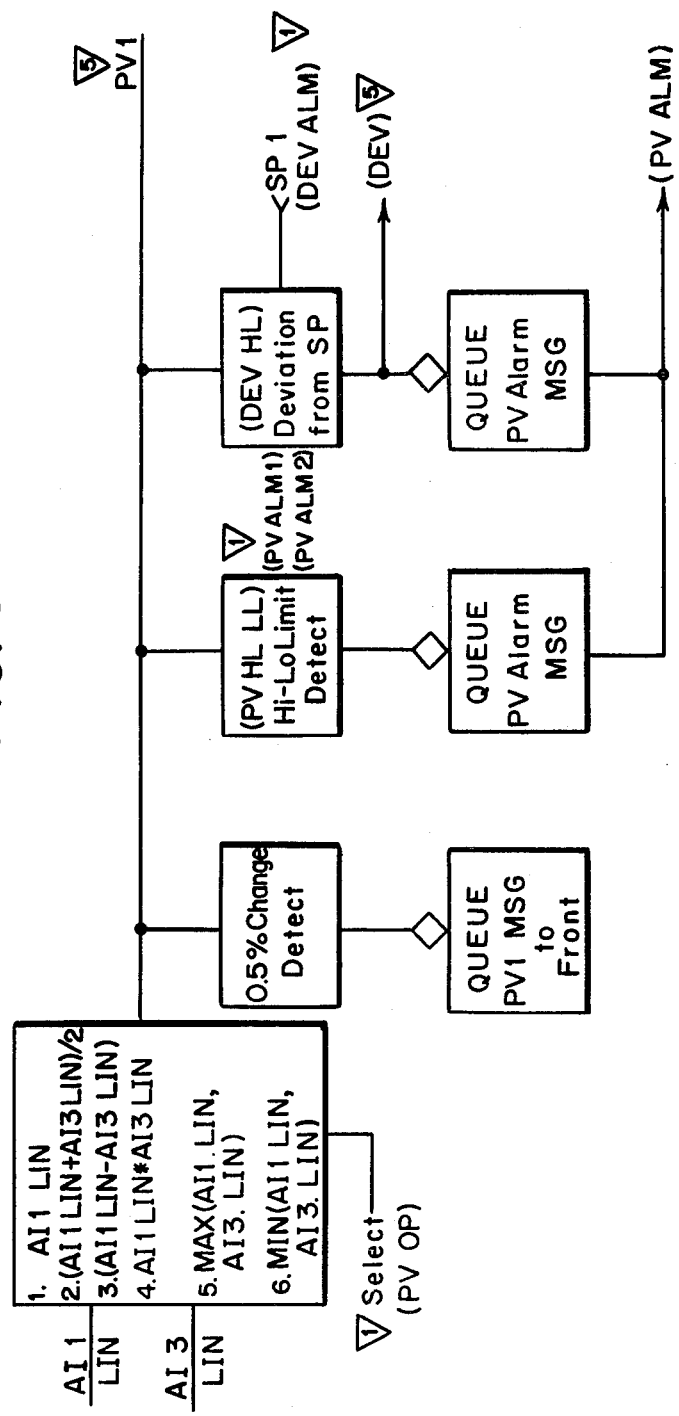
Figure 10:
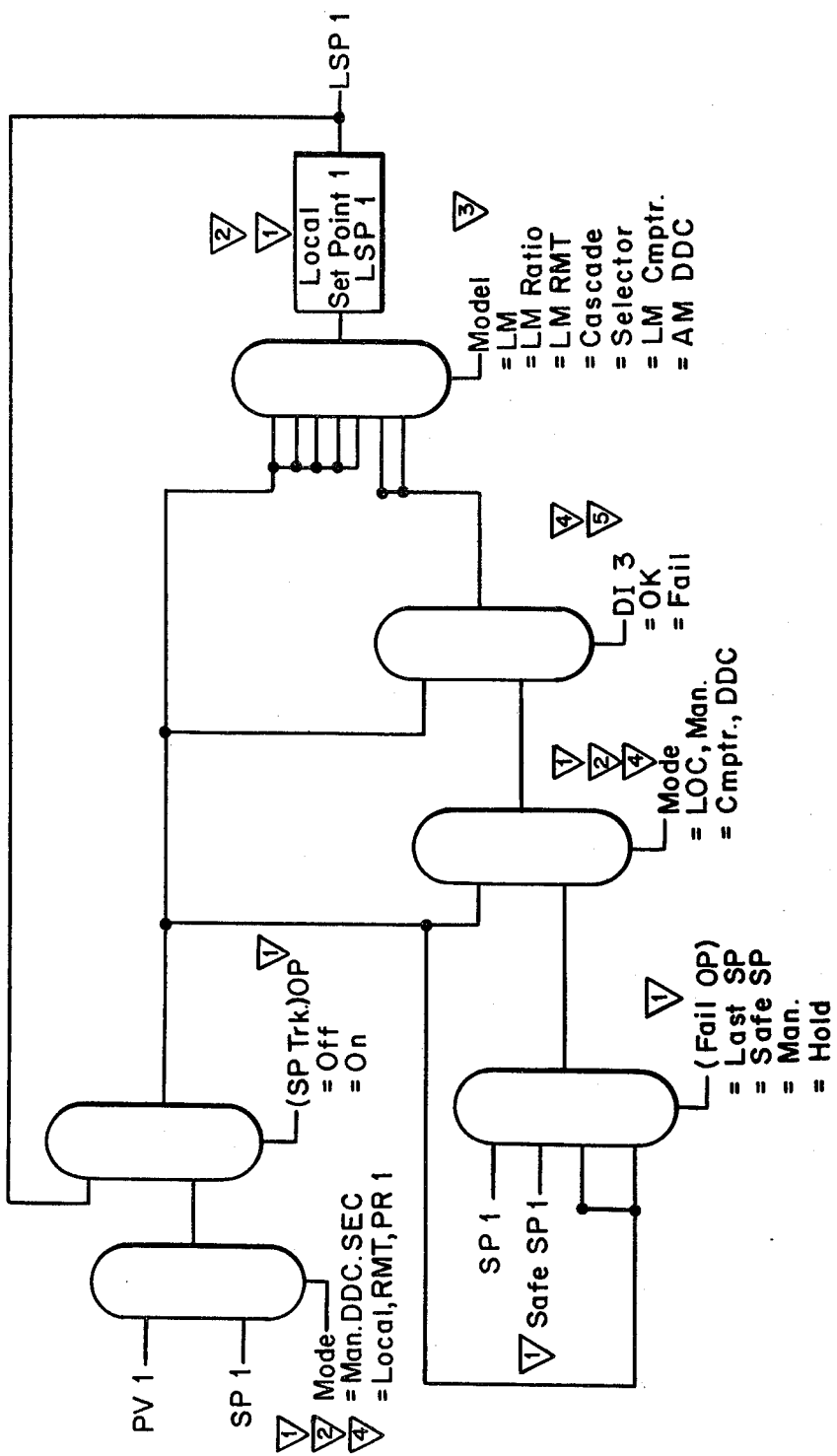

The process variable can be the signal from analog input AI1 or it can be modified as shown in FIG. 9 to be a composite of that signal and the signal from analog input AI3. The key PVOP can be used to select any one of the following signals as the process variable.

=AI1
=AI1−AI3
=AI1×AI3
=(AI1+AI3)/2
=MAX (AI1, AI3)
=MIN (AI1, AI3)

The resulting signal is then tested for several alarm limits. These include a 0.5% change of value, and a value greater than and lower than a limit entered from the keyboard/display by keys PV ALM 1 and PV ALM 2, and a deviation from a set point which can be specified by the key DEV ALM. The process variable is then applied to the PID block (FIG. 13) for calculation of the output.

In the LOCAL/MANUAL controller, the LOCAL/MANUAL REMOTE controller, the LOCAL/MANUAL/COMPUTER controller and the LO- CAL/RATIO controller, the local setpoint (LSP) is provided as follows for operation in the LOCAL and MANUAL modes. In the LOCAL mode, the local setpoint is used as the controller's setpoint. In the MANUAL (MAN) mode, the local setpoint will track the process variable if setpoint tracking is specified by operation of the TRK OP key on the keyboard/display. The software block diagram which produces the local setpoint signal is set forth in FIG. 10.

Figure 11:
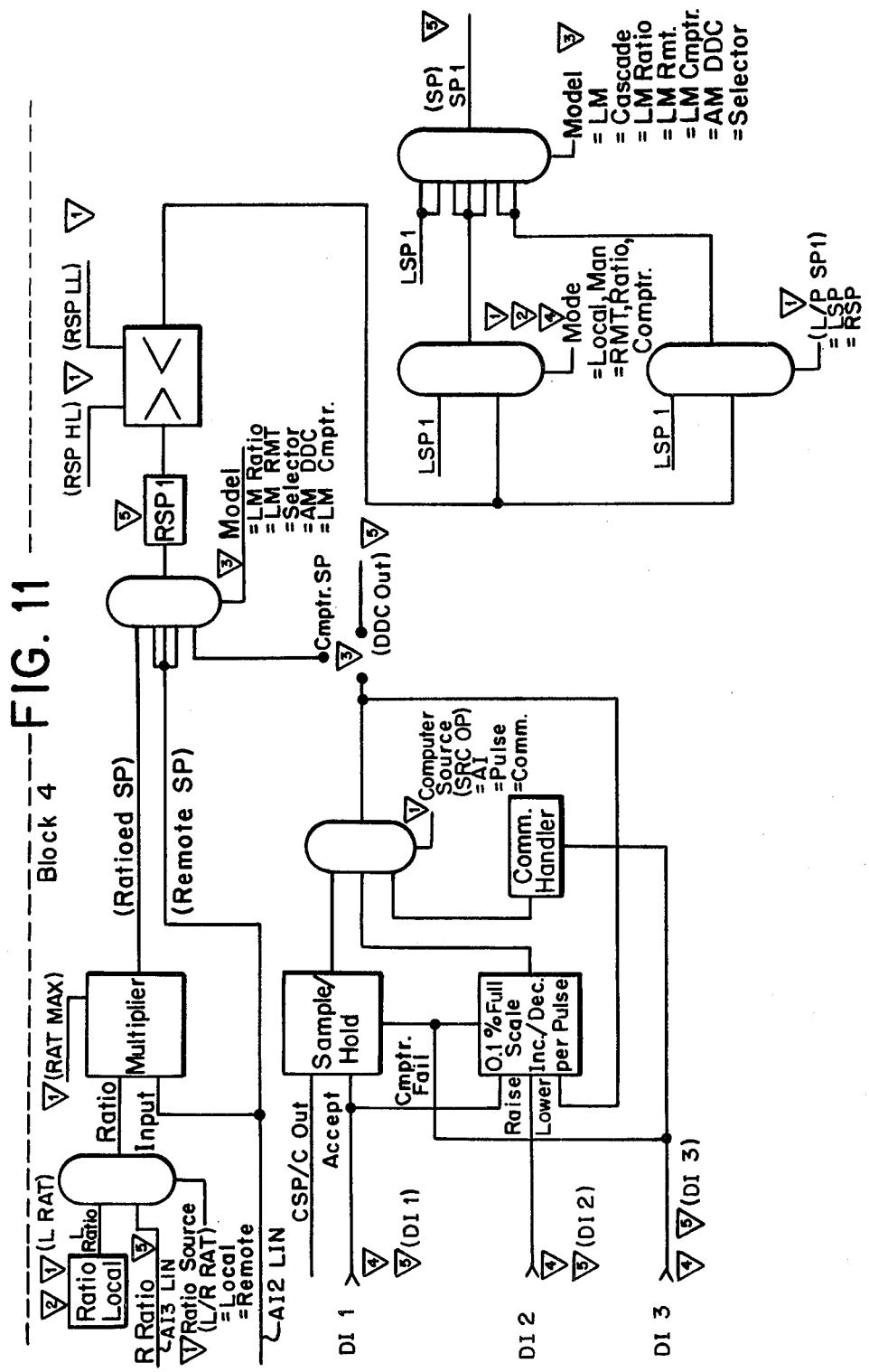

As shown in the upper half of FIG. 11, in the LOCAL/MANUAL/REMOTE controller, the controller's setpoint in the REMOTE-AUTO mode is the linearized analog input AI2LIN. This value is clamped by a remote setpoint lower limit (RSP LL) and a remote setpoint upper limit (RSP HL) entered by the keyboard/display. In the REMOTE-AUTO mode the local setpoint will track the remote setpoint if setpoint tracking is specified by the key SP TRK. Otherwise, the local setpoint will remain unchanged.

In the LOCAL/MANUAL/COMPUTER controller, the setpoint is supplied by the computer when in the COMPUTER-AUTO mode. Three algorithms shown in the bottom left-hand side of FIG. 11 are available for generating the setpoint. With the positional algorithm, the setpoint is updated by a signal from the computer that is applied to the controller via linearized analog input AI2 LIN when digital input (DI1) is true for a specified period of time and the computer fail input (DI3) is inactive. The setpoint is updated by a sample and hold routine. In accordance with a velocity algorithm, the setpoint is raised 0.1% of full scale for each DI1 pulse received and lowered 0.1% of full scale for each DI2 pulse received, provided the computer fail input is inactive. In the communication algorithm the set point is updated with the value contained within an "Update SP" message received through the serial communication module 16. Any one of these three algorithms may be selected by the key SRC OP on the keyboard/display. If setpoint tracking is specified, the setpoint will track the computer setpoint.

In the AUTO/MANUAL/DDC controller, the controller's setpoint may be specified to be either the local setpoint or the linearized analog input AI2 IN, the choice being made by the key L/R SP on the keyboard/display. If the controller is in the AUTO mode with an analog input and setpoint tracking specified, the local setpoint will track the remote setpoint; otherwise it will remain unchanged. In the MANUAL and DDC modes, the local setpoint will track the process variable if setpoint tracking is specified.

In the LOCAL/MANUAL/RATIO controller, the controller's setpoint is the product of the linearized analog input AI2 LIN and either the local ratio (L RAT) or another analog input (AI3LIN) called the remote ratio (R RAT) as shown in the upper left hand corner of FIG. 11. The choice of multipliers is selected by the key L/R RAT on the keyboard/display. In the RATIO/AUTO mode the local ratio will track the ratioed setpoint if setpoint tracking is specified. Otherwise the local setpoint will remain unchanged.

In the CASCADE controller the primary controller's setpoint is the local setpoint (LSP1). In the MANUAL mode, this local setpoint will track process variable PV1 if setpoint tracking is specified. Otherwise, the setpoint will remain unchanged. In the CASCADE/AUTO and PRIMARY/AUTO modes, the primary controller's final output (OUT 1) is the setpoint of the secondary controller. In the SECONDARY-AUTO mode, the secondary controller's local setpoint (LSP 2) is used as the secondary controller's set point. In the MANUAL mode, process variable PV 2 is used as a secondary controller's set point. If setpoint tracking is specified in the MANUAL mode, LSP2 will track PV 2.

In the AUTO SELECTOR controller, the first controller's setpoint may be either a local setpoint or a remote setpoint, the choice being made by the key L/R SP 1. If it is the remote setpoint, the signal is provided by the linearized analog input AI2 LIN. In the MANUAL mode, LSP 1 will track the process variable PV1 if setpoint tracking is specified. Otherwise, the local setpoint will remain unchanged. In all other modes, if the controller's setpoint is the analog input and setpoint tracking is specified, then the local setpoint will track the remote setpoint provided by the analog input. Controller 2 is configured in the same manner as controller 1. The key L/R SP 2 on the keyboard display specifies whether local setpoint LSP 2 or the linearized clamped analog input AI5 LIN is to be used as its setpoint. In the MANUAL mode, LSP 2 will track process variable PV2 if setpoint tracking is specified. There is no provision to permit LSP 2 to track a remote setpoint.

Figure 12:
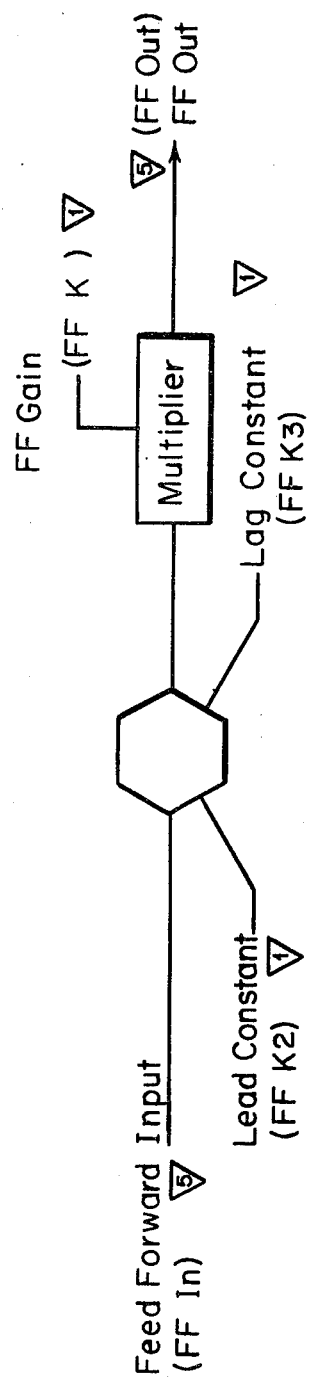

Feedforward control can be used to control processes with long response characteristics where the response of the process to a known load disturbance is of a predictable nature. In a feedforward system, a secondary process variable AI3 or FF signal is utilized along with the primary process variable (PV) to improve the overall control action. In general, FF is a measured parameter whose value changes almost instantly with a load disturbance, while PV is a parameter whose value is controlled at the setpoint level and is not immediately affected by the change. While the feedforward input remains constant, no Feedforward action will occur. As long as FF is not changing, the module will produce an FF output signal of zero. Should a sudden load disturbance occur, FF out will go above or below zero, thus permitting feedforward action to bias the controller's output. The time delay before the correction is applied and the correction's magnitude, sense (i.e. direct/reverse) and duration are all configurable. Once the disturbance is corrected, AI3 will become stable and unchanging and normal controller action is resumed. In this manner, the effects of the disturbance are anticipated by AI3, thereby reducing the time required for PV to stabilize. The feedforward processing is depicted in FIG. 12.

Figure 13:
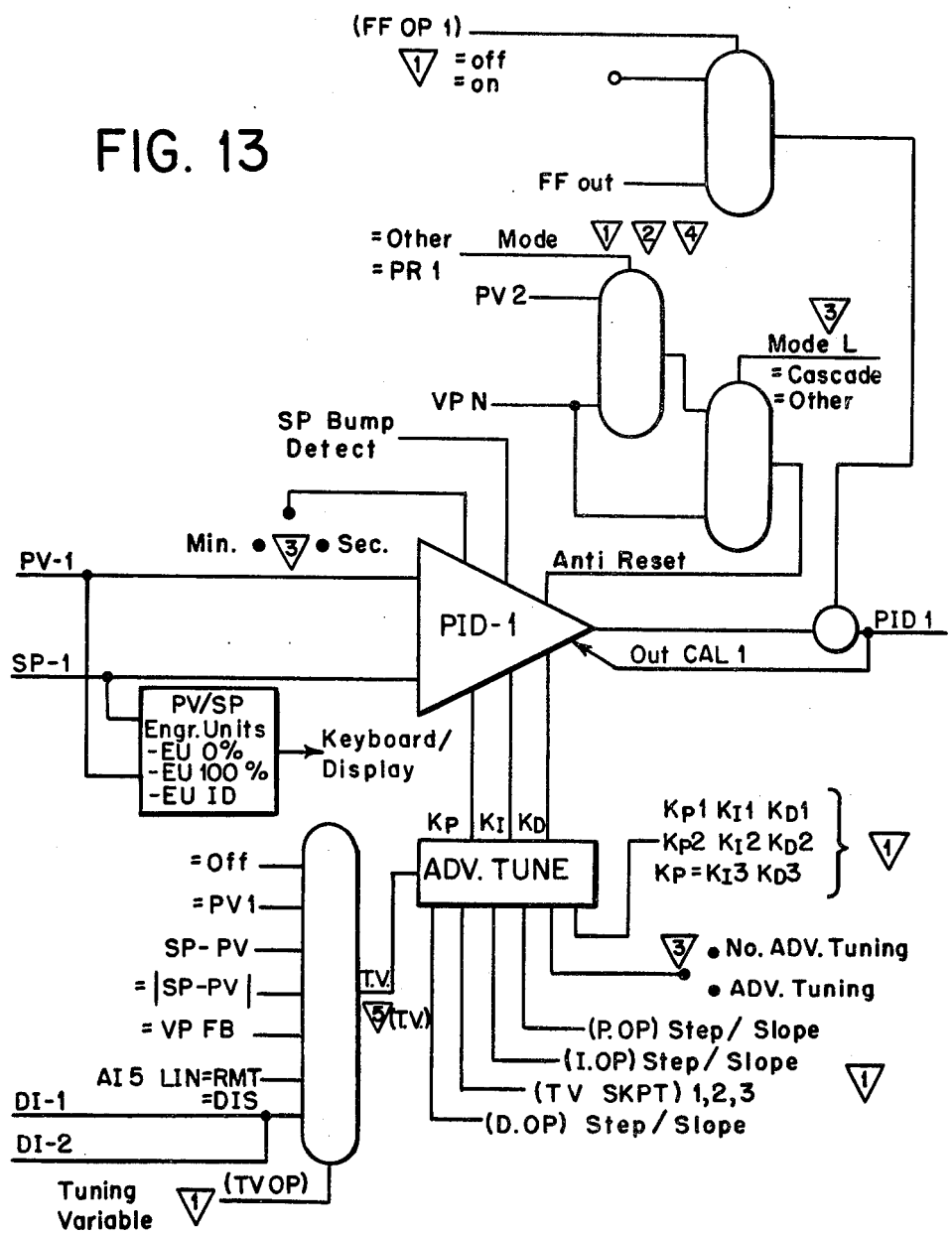

FIG. 13 illustrates the calculation of the PID algorithm. The algorithm is a "velocity" PID algorithm with built-in anti-reset windup protection and rate limiting. The algorithm is of the "interacting" type but permits integral-only action.

The algorithm is as follows:

```
Filt.PV := PV*k + (1−k)*Filt.PV.hist
Delt.PV := Filt.PV − Filt.PV.hist
Delt.OUT := Delt.P + Delt.I + Delt.D
where Delt.P, Delt.I, Delt.D are calculated
as follows :
Delt.P
—
Delt.P := Kp*Delt.PV
Delt.D
—
Delt.D := Kp*Kd*(Delt.PV − Delt.PV.Hist)
Delt.I
—
```

```
                    -continued
BEGIN
  if Ki = 0
  Delt.I := SP — Filt.PV
  else
  Delt.I := (SP — Filt.PV)/Ki
  endif
  if OUT > OUT.HL and Delt.I > 0 or
  if OUT < OUT.LL and Delt.I < 0 or
  if override and OUT > AI4.LIN and Delt.I > 0 or
  if override and OUT < AI5.LIN and Delt.I < 0 or
  if inhib.raise active and Delt.I > 0 or
  if inhib.lower active and Delt.I < 0 or
  if abs(valve.error) > MAX.VALVE.ERROR
      and
      sign (valve,error).NE. sign(Delt.I)
  then
      Delt.I := 0
  else
      if KP .NE. 0
         Delt.I := Kp*Delt.I
      endif
      if FEEDFORWARD is on
         Delt.I := Delt.I + Delt.FFOUT
      endif
  endif
END
```

In accordance with the invention, up to three sets of PID tuning parameters, KP, KI and KD can be selected for use as an advanced tuning feature in the PID algorithm. These sets are selected in accordance with one of the following independent variables: process variable PV1, the deviation between the setpoint and the process variable, the absolute value of the deviation, the valve position feedback, an analog input supplied through AI5 LIN or two external digital inputs. The particular value used is selected by the TV OP key on the keyboard/display. The three sets of tuning parameters may be entered through the keyboard/display using the KP, KI and KD keys. Three breakpoints determining the ranges over which these constants are used may be entered by the TV BKPT key. In addition, a step and slope option may be selected for KI, KP, and KD by the I OP, P OP, D OP keys, respectively.

If the tuning variable is a digital input, only the step option applies. If both digital inputs are high, then KP1, KI1 and KD1 are selected. If the first digital input is high and the second low, then KP2, KI2 and KD2 are selected. If the first digital input is low, KP3, KI3 and KD 3 are selected. Otherwise, for the step option the PID tuning parameters are selected in accordance with the following:

If TV<Breakpoint 1, then K=K1;
If Breakpoint 1<TV<Breakpoint 2, then K=K2;
If Breakpoint 2<TV, then K=K3.

The slope option allows the tuning parameter to be a linear function of the input variable. The PID values, KP, KI and KD are selected by the slope option in accordance with the following criteria:

If TV<Breakpoint 1, then K=K1
If Breakpoint 1<TV<Breakpoint 2, then K=linear function (value between K1 and K2)
If Breakpoint 2=TV, then K=K2
If Breakpoint 2<TV<Breakpoint 3, then K=linear function (value between K2 and K3)
If Breakpoint 3<TV, then K=K3

Figure 14:
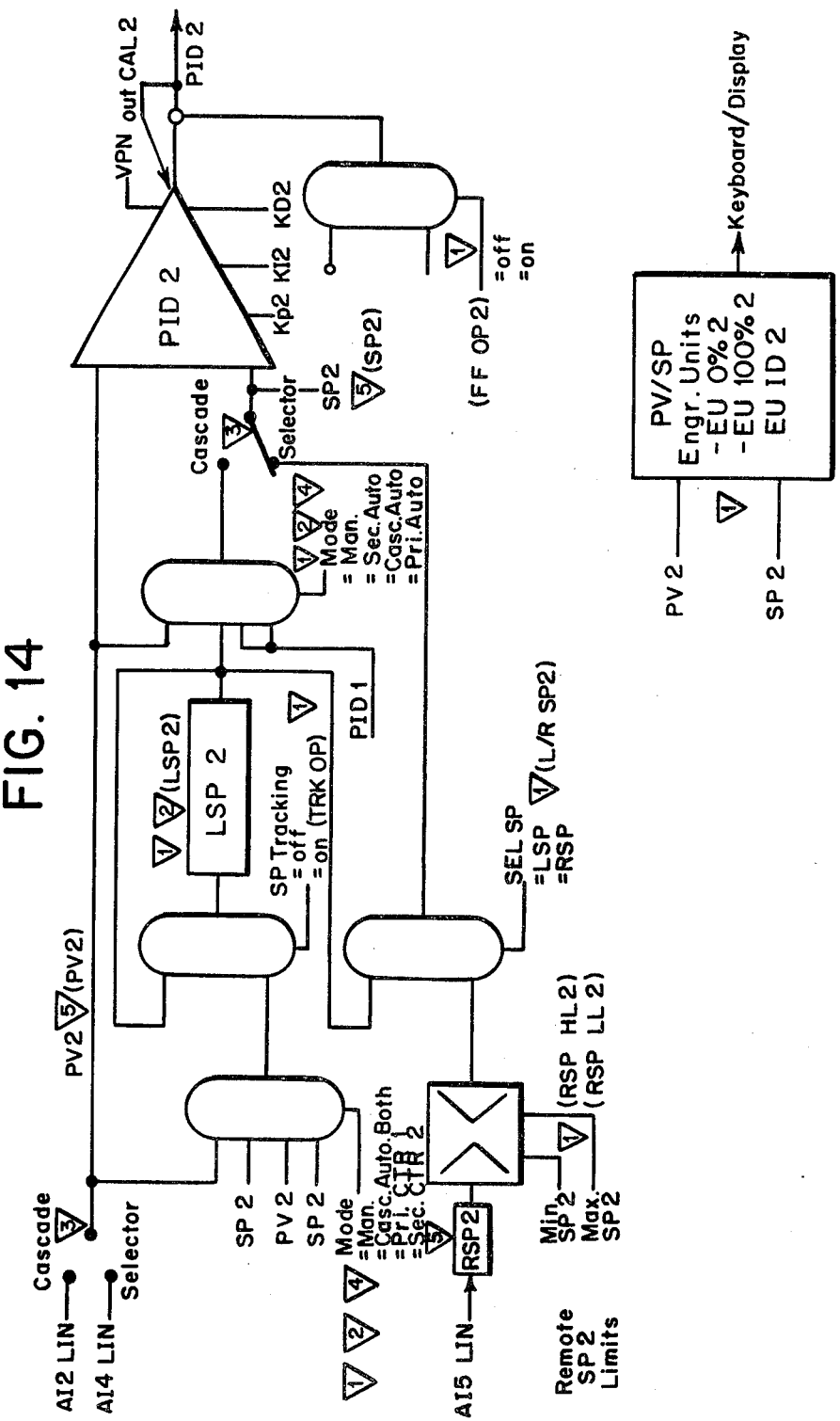

The cascade and auto selector controllers have a second PID controller shown in FIG. 14. This controller uses the same algorithms as the controllers of FIG. 13 and contains the same features except for advanced tuning. The controller uses the PID2 constants KP2, KI2, and KD2 which can be entered through the keyboard/display. For the cascade model the process variable is AI2 LIN and the setpoint can be any one of a number of setpoints depending on the mode of operation of the controller. For the AUTO SELECTOR mode the process variable is AI4 LIN and the setpoint is either LSP2 or is provided through AI5 LIN.

Figure 15:
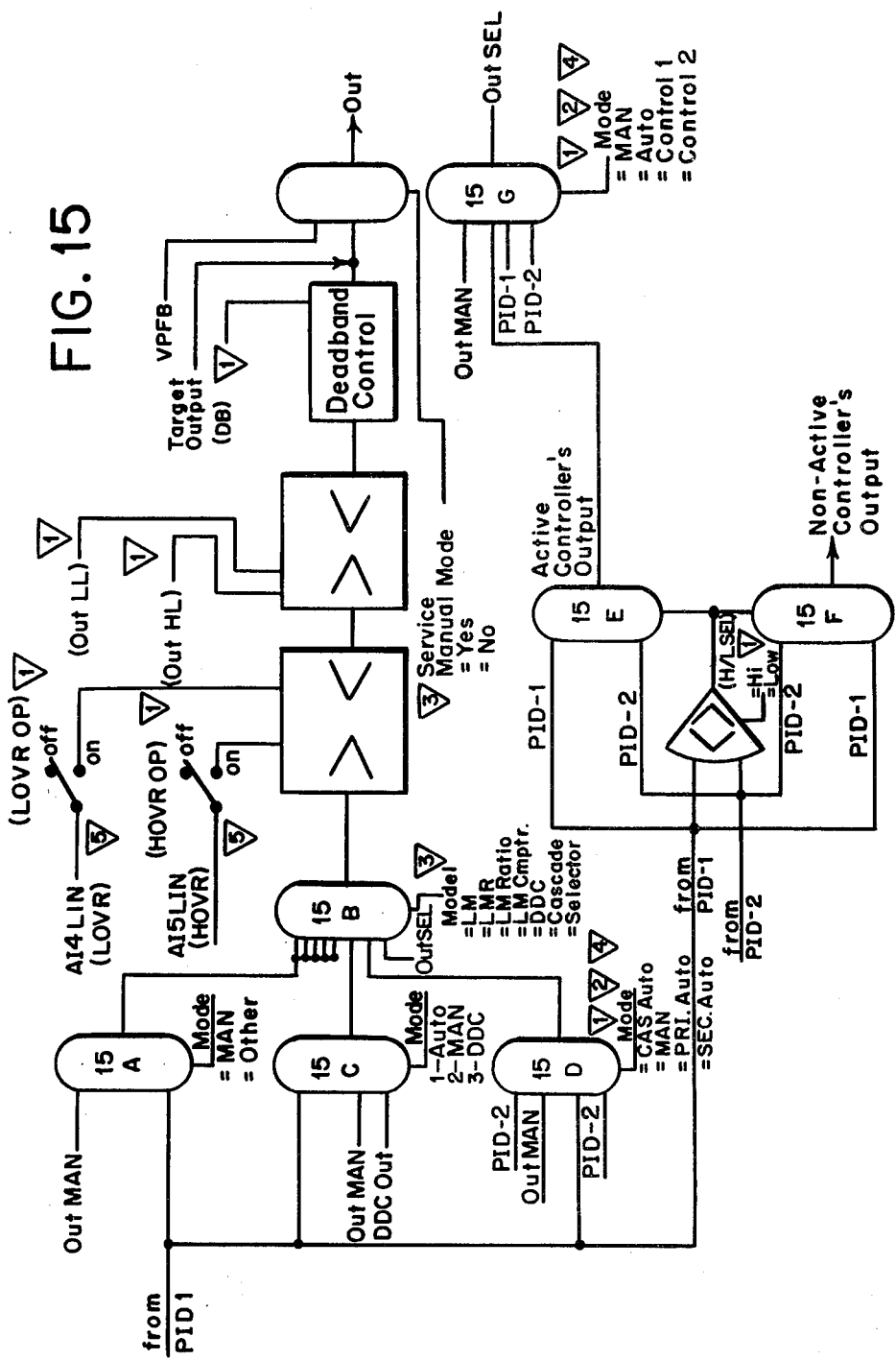

The output of the PID algorithm is processed by the block diagram of FIG. 15. In the MANUAL Mode, the output signal is provided by OUTMAN. Otherwise for all controllers except DDC, CASCADE and AUTO SELECTOR, block 15B selects the output of the PID algorithm as the output of the controller subject to mode selection and overrides.

Block 15C provides signal selection for the DDC controller. In the AUTO mode the output from PID1 is the controller's output. In the DDC mode the output value is supplied directly by a computer.

Block 15D describes output selection for the cascade controller. Unless the mode is PRI AUTO, the controller's output is the output from PID2. In the PRI AUTO mode the controller's output is that from PID1.

Blocks 15E and 15F control the output for the auto selector controller. In the AUTO mode the output is the higher or lower of the output of the two controllers, the choice being specified by the key H/L SEL on the keyboard/display. In the CONTR1 mode, PID1 supplies the output; and in the CONTR2 mode, PID2 supplies the output, as indicated by block 15G.

High and low overrides can be configured by the keyboard entry H OVR OP and L OVR OP. For the high override the output is the minimum of the calculated output and the analog input AI5LIN. For the low override the output is the maximum of the calculated output and the analog input AI4 LIN. The output signal is also subject to output clamping specified by the keyboard/display keys OUT HL and OUT LL.

Finally, a dead band control can be specified by the key DB. When such control is specified, the output of the controller will not change unless the calculated output differs from the current output by the dead band amount. Use of dead band control reduces valve wear by eliminating valve movements that are smaller than the dead band amount. The dead band may be set at any value between 0 and 100%.

Figure 16:
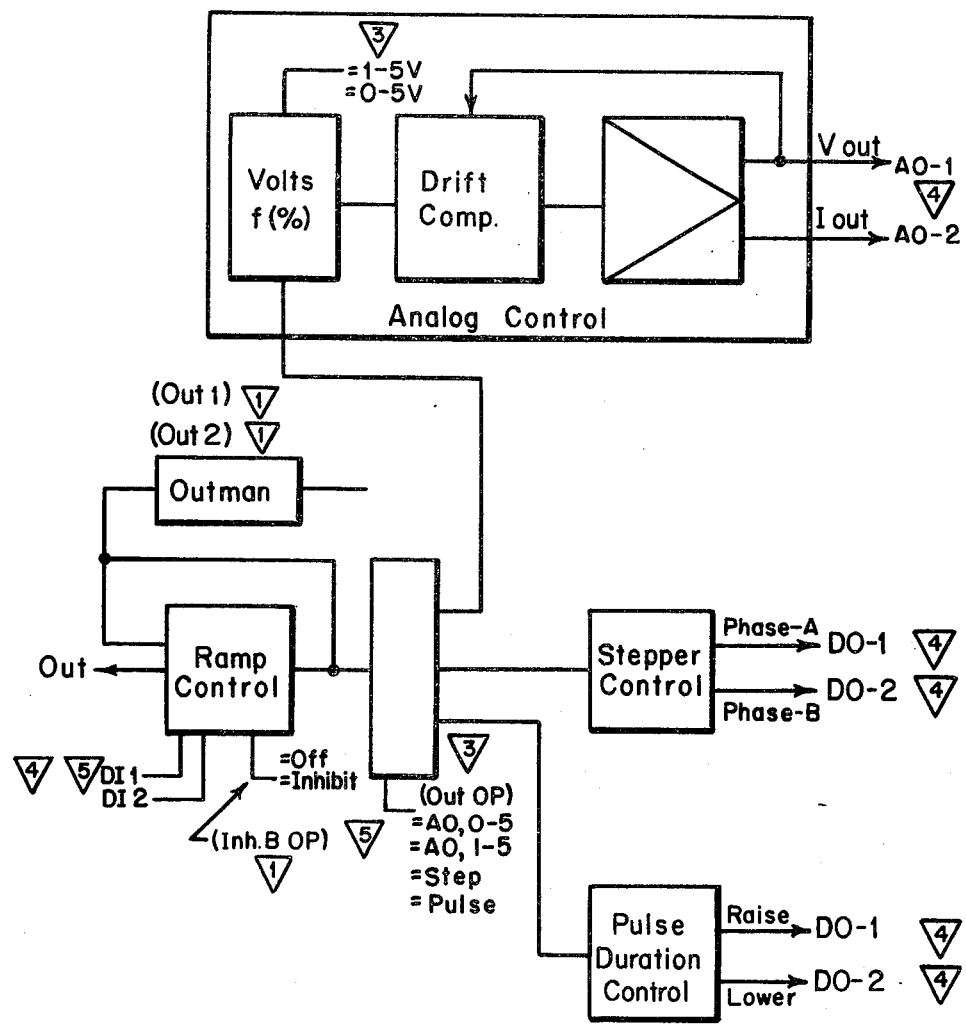

FIG. 16 depicts the hardware/software mechanism for ramping the controller's output OUT 1 from its existing value to the target output value calculated by the controller and for maintaining that target value. The functions within this block execute at a much faster rate than the normal 100 ms loop update period. Analog sample and hold circuit 200 of FIG. 2 is refreshed every 12.5 ms, or 8 times per loop update. For each refresh, ⅛ of the difference between the old and new output values is sent to the sample and hold circuit so that the output appears to ramp to the new value rather than making one discrete step of the entire change. The ramp control shown in FIG. 16 inherently limits the ramp rate to 100% per second, a rate that can be followed by most actuators.

If "Inhibit Raise/Lower" is configured by the keyboard entry INHB OP, then a raise operation will be terminated whenever the INHB R signal is in the Logic 0 state. DI4 is the INHB R signal in the CMPTR and DDC Controllers. DI1 is the INHB R signal in all other Controllers. The INHB R signal is normally configured in conjunction with the Stepper and Pulse Duration Output options. It may also be configured with the analog output option to provide a "digital" high override.

If INHB OP is active, then a lower operation will be terminated whenever the INHB L signal is in the logic 0 state. DI5 is the INHB L signal in the CMPTR and DDC models. DI2 is the INHB L signal in all other models. The INHB L signal is normally configured in conjunction with the Stepper and Pulse Duration Output options. It may also be configured with the analog output option to provide a "digital" low override.

Advantageously, the controller's actual output is read through multiplexer 150 to allow drift-compensation and offset correction of the analog output. The sample/hold analog output circuitry is refreshed every 12.5 milliseconds. The output value is adjusted as required over the next loop update period to ramp the output to the new target value. One of switches 210 specifies the full scale output range to be either 0–5 Volts (0–20 mA) or 1–5 Volts (4–20 mA).

If the Stepper control is selected by switches, the phase A and phase B digital outputs (OUT 1 and OUT 2) are sequenced over the next loop processing period as required to step the Stepper Actuator to the new target angular position. Maximum step rate is 1 step every 5 milliseconds or 200 steps per second (10 second full scale response).

If the pulse duration control is selected and if a RAISE is required, digital outputs OUT 1 and OUT 2 are set to the 0 and 1 states. If a LOWER is required, OUT 1 and OUT 2 are set to the 1 and 0 states. If no change is required, the outputs are both set to the 1 state. Actuator full scale response time is 10 sec; and Pulse duration resolution is 10 milliseconds.

Figure 17:
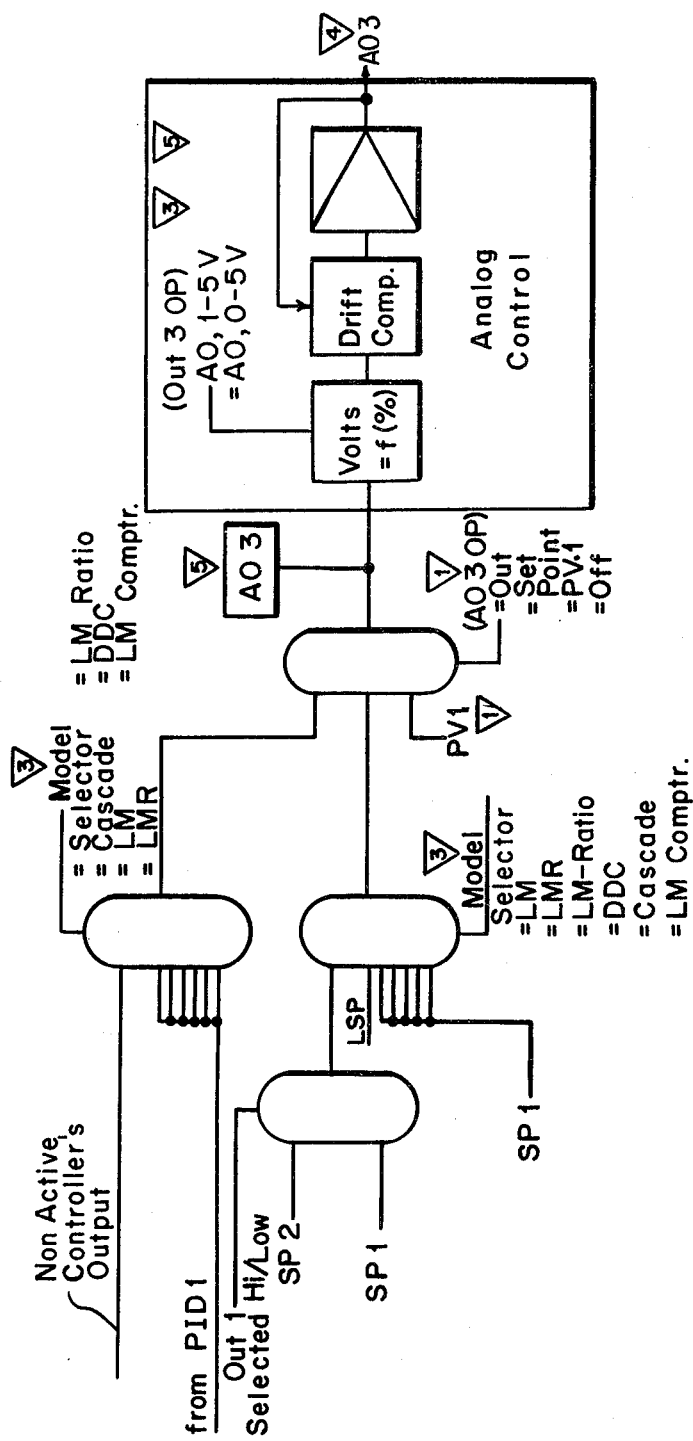

An auxiliary output A03 is also available as shown in FIG. 17. One of hardware switches 210 sets the range of this output to either 0–5 volts or 1–5 volts. As in the case of OUT 1, the sample & hold circuitry is refreshed every 12 milliseconds and drift compensation is performed. However, A03 is not ramped. One of three variables OUT, SET POINT and PV1 can be selected to drive the auxiliary output by the A03 OP key. By selecting A03 OPT=OUT for the AUTO SELECTOR controller, A0 3 is the unclamped output of either controller 1 or controller 2, whichever was not selected as the main output OUT1. For all other models, A03 is the unclamped output of controller 1. By selecting A03 OP=SP for the AUTO SELECTOR controller A03 is the setpoint of the controller whose output was selected as the main output. For the COMPUTER controller, the clamped remote setpoint will be sent out; and for all other models, the local setpoint LSP is used. For AO3 OP=PV 1, process variable PV1 is the output. PV1 may be a calculated value such as the average of two analog inputs.

What is claimed is:

1. A microprocessor based single loop control instrument comprising:
    a first microprocessor,
    a read only memory in which is stored an operating program for said first microprocessor, said program containing machine instructions sufficient to perform a single loop control PID algorithm using the tuning parameters KP, KI and KD which produces an output signal in response to at least a process variable and a setpoint and sufficient to operate said control instrument as one of at least two different types of controllers each having at least two operating modes,
    a random access memory,
    means for entering into said random access memory at least two sets of said tuning parameters and at least one breakpoint,
    means for selecting a tuning parameter from one set of tuning parameters or the other in accordance with whether a tuning variable is greater or lesser than said breakpoint,
    means for causing said control instrument to operate as one of the controller types provided for by the program stored in said read only memory, and
    means for selecting the mode of operation of the controller selected by said causing means.

2. The single loop control instrument of claim 1 further comprising:
    a microprocessor based front panel further comprising:
        a microprocessor,
        a bar graph display controlled by said microprocessor,
        means for selecting at least one variable for display on said bar graph display,
        means for slewing a variable displayed by said bar graph display, and
    a communication bus linking the microprocessor of said front panel with the first microprocessor of said control instrument.

3. The control instrument of claim 1 further comprising:
    a communication bus connected to said microprocessor, and
    at least one additional microprocessor based instrument in which a microprocessor is connected to said communication bus.

4. The control instrument of claim 1 further comprising:
    a microprocessor based keyboard instrument which can be connected by a communication bus to said first microprocessor, and
    a control program stored in said read only memory which can be modified by operation of the keys of said keyboard.

5. The control instrument of claim 1 further comprising:
    a microprocessor based keyboard/display instrument which can be connected by a communication bus to said first microprocessor,
    a control program stored in said read only memory which can be modified by operation of the keyboard, and
    means for displaying on said keyboard/display signals from said first microprocessor.

6. The single loop control instrument of claim 1 further comprising a microprocessor based communication module for converting parallel signals from said first microprocessor to serial signals and for converting serial signals to parallel signals which are supplied to said first microprocessor.

7. The single loop control instrument of claim 1 further comprising:
    a second microprocessor that is connected to said first microprocessor via a communication bus and comprises means for tracking said output control signal from said first microprocessor and read only memory,
    means for signalling the failure of the first microprocessor, and means for switching an output of the control instrument from said output signal generated by said first microprocessor to an output signal generated by said second microprocessor, whereby a bumpless transfer in the output signal is achieved since the second microprocessor had been tracking the output of the first microprocessor.

8. The control instrument of claim 1 wherein said read only memory contains machine instructions sufficient to operate said control instrument as at least two of the following types of controllers:
   a local/manual controller,
   a local/manual/remote controller,
   a local/manual/computer controller,
   an auto/manual/direct digital control controller,
   a local/manual/ratio controller,
   a cascade controller, and
   an auto/select controller.

9. A microprocesor based single loop control instrument comprising:
   a first microprocessor,
   a read only memory in which is stored an operating program for said first microprocessor, said program containing machine instructions sufficient to perform a single loop control PID algorithm using the tuning parameters KP, KI and KD which produces an output signal in response to at least a process variable and a setpoint and sufficient to operate said control instrument as one of at least two different types of controllers each having at least two operating modes,
   a random access memory,
   means for entering into said random access memory at least two sets of said tuning parameters and at least one breakpoint,
   means for selecting a tuning parameter from one set of tuning parameters or the other in accordance with whether a tuning variable is greater or lesser than said breakpoint,
   means for causing said control instrument to operate as one of the controller types provided for by the program stored in said read only memory,
   a communication bus connected to said first microprocessor, and
   a control panel comprising:
      a second microprocessor connected to said communication bus,
      a bar graph display controlled by said second microprocessor for displaying at least one signal related to the operation of said control instrument,
      means for selecting the mode of operation of the controller selected by said causing means, and
      means for selecting at least one of the signals displayed by said bar graph display.

10. The control instrument of claim 9 wherein said read only memory contains machine instructions sufficient to operate said control instrument as at least two of the following types of controllers:
    a local/manual controller,
    a local/manual/remote controller,
    a local/manual/computer controller,
    an auto/manual/direct digital control controller,
    a local/manual/ratio controller,
    a cascade controller, and
    an auto/select controller.

11. A microprocessor based single loop control instrument comprising:
    a first microprocessor,
    a read only memory in which is stored an operating program for said first microprocessor, said program containing machine instructions sufficient to perform a single loop control PID algorithm using the tuning parameters KP, KI and KD which produces an output signal in response to at least a process variable and a setpoint,
    a random access memory,
    means for entering into said random access memory at least two sets of said tuning parameters and at least one breakpoint, and
    means for selecting a tuning parameter from one set of tuning parameters or the other in accordance with whether a tuning variable is greater or lesser than said breakpoint.

12. The single loop control instrument of claim 11 further comprising:
    a second microprocessor that is connected to said first microprocessor via a communication bus and comprises means for tracking said output control signal from said first microprocessor and read only memory,
    means for signalling the failure of the first microprocessor, and
    means for switching an output of the control instrument from said output signal generated by said first microprocessor to an output signal generated by said second microprocessor, whereby a bumpless transfer in the output signal is achieved since the second microprocessor had been tracking the output of the first microprocessor.

* * * * *